(12) United States Patent
Agvald et al.

(10) Patent No.: US 12,486,216 B2
(45) Date of Patent: Dec. 2, 2025

(54) PROCESSES FOR PREPARING NITROSYLATED PROPANEDIOLS, COMPOSITIONS COMPRISING THE SAME, AND MEDICAL USES THEREOF

(71) Applicant: ATTGENO AB, Solna (SE)

(72) Inventors: Per Håkan Agvald, Stockholm (SE); Leif Christofer Adding, Åkersberga (SE); Kristofer Bo Ingemar Nilsson, Örebro (SE); Anna Lena Elisabeth Minidis, Järna (SE); Johan Salman Malmberg, Stockholm (SE); Alexander Bogdan Emil Minidis, Järna (SE)

(73) Assignee: ATTGENO AB, Solna (SE)

( * ) Notice: Subject to any disclaimer, the term of this patent is extended or adjusted under 35 U.S.C. 154(b) by 1010 days.

(21) Appl. No.: 17/296,593

(22) PCT Filed: Nov. 27, 2019

(86) PCT No.: PCT/EP2019/082800
§ 371 (c)(1),
(2) Date: May 25, 2021

(87) PCT Pub. No.: WO2020/109420
PCT Pub. Date: Jun. 4, 2020

(65) Prior Publication Data
US 2022/0002223 A1    Jan. 6, 2022

(30) Foreign Application Priority Data
Nov. 27, 2018   (GB) ..................................... 1819298

(51) Int. Cl.
*A61K 31/70*     (2006.01)
*A61K 31/047*    (2006.01)
*C07C 201/04*    (2006.01)

(52) U.S. Cl.
CPC ........ *C07C 201/04* (2013.01); *C07B 2200/07* (2013.01)

(58) Field of Classification Search
CPC .... A61K 31/7016; A61K 31/70; A61K 31/21; A61K 31/04; A61K 31/047
See application file for complete search history.

(56) References Cited

U.S. PATENT DOCUMENTS

| | | | |
|---|---|---|---|
| 5,646,181 | A | 7/1997 | Fung et al. |
| 5,670,177 | A | 9/1997 | Briend et al. |
| 6,103,769 | A | 8/2000 | Kelm et al. |
| 2014/0271807 | A1 | 9/2014 | Perricone |
| 2023/0201132 | A1* | 6/2023 | Agvald ..................... A61P 1/00 514/727 |

FOREIGN PATENT DOCUMENTS

| | | |
|---|---|---|
| WO | WO 93/05709 | 4/1993 |
| WO | WO 1994/01103 | 1/1994 |
| WO | WO 94/16740 | 8/1994 |
| WO | WO 95/02181 | 1/1995 |
| WO | WO9634583 | 11/1996 |
| WO | WO 2006/031191 | 3/2006 |
| WO | WO 2007/106034 | 9/2007 |
| WO | WO2014159986 | 10/2014 |
| WO | WO2014160016 | 10/2014 |
| WO | WO2014160047 | 10/2014 |
| WO | WO2014160070 | 10/2014 |
| WO | WO2014160102 | 10/2014 |
| WO | WO2014160103 | 10/2014 |
| WO | WO2014160138 | 10/2014 |
| WO | WO2014160145 | 10/2014 |
| WO | WO2014160187 | 10/2014 |

OTHER PUBLICATIONS

Wang et al., Physical Chemistry Chemical Physics (2016), 18(36), 25249-25256. (Year: 2016).*
Grossi et al., A New Synthesis of Alkyl Nitrites: The Reaction of Alkyl Alcohols with Nitric Oxide in Organic Solvents, J. Org. Chem., 1999, 64, 8076-8079.
Barrington et al., Cochrane Database Syst. Rev., 2001, 4, CD000399.
Cederqvist et al., Biochem. Pharmacol., 1994, 47, 1047-53.
Chotigeat et al., J. Med. Assoc. Thai., 2007, 90, 266-71.
Gustafsson et al., Biochem. Biophys. Res. Commun., 1991, 181, 852-7.
Kuhn et al., Journal of the American Chemical Society, 1954, 76, 328-329.
Larsen et al., N. Eng. J. Med, 2006, 355, 2792-3.
Nilsson et al., Drug Design, Development and Therapy, 2018, 12, 685-694.
Rosenkranz, Stephan et al., European Heart Journal, 37(12), 942-954 (2016).
Tiller, D et al., PLoS One, 8(3), e59225 (2013).
Summerfield et al., Respir. Care., 2011, 57, 444-8.
Persson et al., Acta Physiol. Scand., 1990, 140, 449-57.
Wang et al., Physical Chemistry Chemical Physics, 2016, 18, 25249-25256.

(Continued)

*Primary Examiner* — Bethany P Barham
*Assistant Examiner* — Danielle Johnson
(74) *Attorney, Agent, or Firm* — Ballard Spahr LLP

(57) ABSTRACT

Disclosed is a process for the synthesis of mono- and bis-nitrosylated propanediols, as well as compositions and pharmaceutical formulations that includes the compounds. The process proceeds by reacting a corresponding propanediol that is not nitrosylated with a source of nitrite, optionally in the presence of a suitable acid. When the source of nitrite is an organic nitrite, reacting step is performed in a suitable organic solvent, and when the source of nitrite is an inorganic nitrite, the reacting step is performed in a bi-phasic solvent mixture comprising an aqueous phase and a non-aqueous phase. Also disclosed are methods of treating a condition wherein administration of nitric oxide (NO) has a beneficial effect by administering said compounds, compositions or formulations.

11 Claims, 3 Drawing Sheets

(56) References Cited

OTHER PUBLICATIONS

Silkoff, Am. J. Respir. Crit. Care. Med., 1999, 160, 2104-17.
ERS Task Force Report 10, 1997, 1683-93.
International Search Report and Written Opinion were mailed on Feb. 28, 2020 by the International Searching Authority for International Application No. PCT/EP2019/082800, filed on Nov. 27, 2019 and published as WO 2020/109420 on Jun. 4, 2020 (Applicant—ATTGENO AB) (12 Pages).
Blacklock, T J et al. "A Versatile Synthesis of 1,1 Dioxo 7-Substituted Cephems: Preparation of the Human Leukocyte Elastase (HLE Inhibitor 1,1-Dioxi-Trans-7-Methocephalpsporanic Acid Tert-Butyl Ester", Journal of Organic Chemistry, American Chemical Society, vol. 54, No. 16, (Aug. 4, 1989) pp. 3907-3913.
Doyle, M P et al. "Hydrolysis, Nitrosyl Exchange, and Synthesis of Alkyl Nitrites", Journal of Organic Chemistry, vol. 48, No. 20 (Jan. 1, 1983) pp. 3379-3382.
Nilsson, Kristopher F. et al. "Formation of new bioactive organic nitrites and their identification with gas chromatographymass spectrometry and liquid chromatography coupled to nitrite reduction", Biochemical Pharmacology, Elsevier, vol. 82, No. 3 (Apr. 18, 2011) pp. 248-259.
Nilsson, Kristopher F. et al. "The Novel nitric oxide donor PDNO attenuates ovine ischemia-reperfusion induced renal failure", Intensive Care Medicine Experimental, Biomed Cerntral Ltd. London, UK, vol. 5, No. 1, Jun. 9, 2017.

* cited by examiner

PROCESSES FOR PREPARING NITROSYLATED PROPANEDIOLS, COMPOSITIONS COMPRISING THE SAME, AND MEDICAL USES THEREOF

CROSS-REFERENCE TO RELATED APPLICATIONS

This application is a U.S. National Phase Application of International Application No. PCT/EP2019/082800, filed Nov. 27, 2019, which claims priority to Great Britain Application No. 1819298.9, filed Nov. 27, 2018, each of which are hereby incorporated by reference in their entirety.

FIELD OF INVENTION

The present invention relates to a novel process for the synthesis of mono- and bis-nitrosylated propanediols, as well as novel compositions and pharmaceutical formulations comprising said compounds. The invention also relates to methods of treating a condition wherein administration of nitric oxide (NO) has a beneficial effect by administering said compounds, compositions or formulations.

BACKGROUND OF THE INVENTION

The list or discussion of an apparently prior-published document in this specification should not necessarily be taken as an acknowledgment that the document is part of the state of the art or common general knowledge.

Pulmonary hypertension (PH) was, until recently, defined as an increase in mean pulmonary arterial pressure (mPAP) at or above 25 mmHg at rest and it can be divided in more slowly developing chronic forms (PH) and acute pulmonary hypertension (aPH). This definition was recently updated to be an increase in mean pulmonary arterial pressure (mPAP) at or above 20 mmHg at rest in combination with a Wood Units value of >3. In aPH, acute induced constriction of the pulmonary vessels rapidly increases mPAP; it could be elicited as a response a variety conditions such as major surgery (e.g. heart surgery), lung emboli and sepsis. In aPH no adaption of the right heart have been developed which increase the risk for right heart failure, furthermore the patients are typically severely ill from the condition eliciting the aPH and normally have critically low systemic blood pressure. In patients with the more chronic forms of PH, aPH could superposed on the chronic PH leading to deleterious high pressure resulting in right heat failure and death. Acute pulmonary hypertension is a vast problem causing untidy death and suffering to millions of people in the world and since diagnosis usually demands right heart catheterization and efficient lung-selective treatments are lacking the full extent of the problem is not registered and known.

Under normal conditions the right heart receives deoxygenated blood from the systemic circulation and pumps the blood through the lungs, where the cardiac output of the pulmonary circulation equals the volume of the blood circulating all other body organs.

Despite the high flow rate through the lungs, blood pressure in the pulmonary circulation is only one fifth of that in the systemic circulation. The low resistance in the pulmonary circulation is attributed to large cross-sectional area of pulmonary arteries and that pulmonary vessels are much shorter than the systemic vessels. The left heart is a strong pump (working against a high pressure) that makes blood flow in the systemic circulation to e.g. the liver, stomach, kidneys and the heart itself and it is common knowledge that high blood pressure in the systemic circulation can cause many health problems including heart failure, stroke and kidney disease.

Many physiological factors influence the complex control of the blood flow in the systemic and pulmonary circulation. The blood vessels in the systemic circulation are normally in a state of vasoconstriction (small muscles in the vessel wall contract the vessel) whereas blood vessels in the pulmonary circulation are under constant vasodilation (i.e. relaxed, widened vessels) thereby maintaining the very low resistance to blood flow and a resulting very low blood pressure compared to the systemic circulation.

In a variety of life-threatening diseases and after major surgeries the pathophysiological response with an intense inflammatory reaction alters the physiologic state of systemic and pulmonary blood vessels. These alterations commonly result in a condition where the systemic blood vessels suddenly dilate and a critically low systemic blood pressure (systemic hypotension) develops which may diminish the blood flow to the vital organs such as the brain, heart, liver and kidney. In parallel, paradoxically, the pulmonary blood vessels abruptly constrict leading to acute pulmonary hypertension and right heart failure, which reduce the cardiac output and further aggravate the systemic hypotension. These critically ill and hemodynamic unstable patients normally have to be treated in intensive care units where the challenging mission is to balance drug therapies using vasopressor and heart strengthening drugs to restore the systemic blood pressure and pulmonary vasodilating drugs to attenuate the acute life-threatening pulmonary hypertension.

Acute PH is frequently underdiagnosed, and treatment is often delayed (Rosenkranz, Stephan et al., *European Heart Journal*, 37(12), 942-954 (2016)). The reason for aPH being so fatal is that the right heart is a weak pump normally working against a low pressure and risks failing (right heart failure) if the mean pressure in the pulmonary circulation rapidly reaches >40 mmHg. Acute PH is a distinct critical condition and should not be mixed up with chronic pulmonary hypertension (Tiller, D et al., PLoS One, 8(3), e59225 (2013)). In chronic diseases when pressure in the pulmonary circulation over time gradually increases the right heart will adapt and increase in size and strength and much higher outflow pressures can then be sustained. Even people in good health who e.g. contract an infection, a pulmonary embolus (blood clot in the lung) or undergo major surgery can develop aPH with deteriorating complications.

Acute pulmonary hypertension is an enormous problem causing painful, and premature, death and suffering to millions of people in the world and since proper diagnosis and treatments are lacking the full extent of the problem is not registered and known.

The treatment options for the patients developing aPH are severely limited today. The reason for this is that the patients typically present with a critically low systemic blood pressure. Attempts to treat with intravenous (i.v.) vasodilating drugs often leads to lethal systemic hypotension since the drugs available today pass the lung (normally <30 s) and 'spill over' in the systemic circulation. Therefore, the optimal intravenous drug to treat aPH should only dilate the pulmonary vessels and have no effect in the systemic circulation. As of today, there are no intravenous lung-selective vasodilatory drugs on the market.

To overcome the systemic side effects of i.v. administered vasodilator drugs, administration by inhalation of nitric oxide or prostacyclin has been developed. Unfortunately, these drugs, even if effective in some cases, are often insufficient because they are often inactivated before reaching the target pulmonary vessels. Another major drawback with the inhaled drugs used today is that administration by inhalation is more complicated than to give an intravenous drug infusion. The complexity of administering inhaled nitric oxide is so considerable that healthcare staff need special training and therefore many hospitals do not even have the equipment due to the associated expensive.

Nitric oxide (NO) is a molecule of importance in several biological systems. It is continuously produced in the lung and can be measured at ppb (parts per billion) levels in expired gas. The discovery of endogenous NO in exhaled air, and its use as a diagnostic marker of inflammation, dates to the early 1990s (see, for example, WO 93/05709 and WO 95/02181). Today, the significance of endogenous NO is widely recognised, as evidenced by the commercial availability of a clinical NO analyser (NIOX®, the first tailor-made NO analyser for routine clinical use in asthma patients, as manufactured by AEROCRINE AB, Solna, Sweden).

Since these early experiments, it is become generally recognised that endogenous nitric oxide (NO) is of critical importance as a mediator of vasodilation in blood vessels. In particular, nitric oxide plays an important role in the modulation of pulmonary vascular tone to optimise ventilation-perfusion matching in healthy human adults (i.e. matching the air that reaches the alveoli with the blood that reaches the alveoli via the capillaries, so that the oxygen provided via ventilation is just sufficient to fully saturate the blood; see, for example, Persson et al., *Acta Physiol. Scand.*, 1990, 140, 449-57). Measuring NO in exhaled breath is a good way of monitoring changes in endogenous NO production or scavenging in the lung (Gustafsson et al., *Biochem. Biophys. Res. Commun.*, 1991, 181, 852-7).

Since ventilation-perfusion matching disturbances and increased pulmonary artery blood pressure are features of pulmonary embolism, inhaled NO has been tested as a potential treatment. For example, U.S. Pat. No. 5,670,177 describes a method for treating or preventing ischemia comprising administering to a patient by an intravascular route a gaseous mixture comprising NO and carbon dioxide wherein the NO is present in an amount effective to treat or prevent ischemia. U.S. Pat. No. 6,103,769 discloses a similar method, with the difference that a NO-saturated saline solution is used.

Furthermore, nitric oxide/oxygen blends are used as a last-resort gas mixture in critical care to promote capillary and pulmonary dilation to treat primary pulmonary hypertension in neonatal patients and post-meconium aspiration related to birth defects (see Barrington et al., *Cochrane Database Syst. Rev.*, 2001, 4, CD000399 and Chotigeat et al., *J. Med. Assoc. Thai.*, 2007, 90, 266-71). Similarly, NO is administered as salvage therapy in patients with acute right ventricular failure secondary to pulmonary embolism (Summerfield et al., *Respir. Care.*, 2011, 57, 444-8). Inhaled NO is also approved in Europe and Japan for the treatment of acute pulmonary hypertension in cardiac surgery patients.

As an alternative to providing NO as a gas or dissolved in solution, others have investigated the use of NO-delivering compounds. For example, WO 94/16740 describes the use of NO-delivering compounds, such as S-nitrosothiols, thionitrites, thionitrates, sydnonimines, furoxans, organic nitrates, nitroprusside, nitroglycerin, iron-nitrosyl compounds, etc., for the treatment or prevention of alcoholic liver injury.

Nitrates are presently used to treat the symptoms of angina (chest pain). Nitrates work by relaxing blood vessels and increasing the supply of blood and oxygen to the heart while reducing its workload. Examples of presently available nitrate drugs include:

a) Nitroglycerin (glyceryl trinitrate) (1,2,3-propanetriol-nitrate), which is today mostly taken sublingually to curb an acute attack of angina. However, strong headaches and dizziness due to the rapid and general vasodilatory effect are frequently encountered side-effects. Nitroglycerin infusion concentrates are also available and are diluted in isotonic glucose or physiological saline for intravenous infusion.

b) Isosorbide mononitrate (1,4:3,6-dianhydro-D-glucitol-5-nitrate), which is taken as prophylactic against angina pectoris. Tolerance development is a problem in long-term treatment regimens. Frequent side-effects include headache and dizziness, as encountered with nitroglycerin.

c) Isosorbide dinitrate (1,4:3,6-dianhydro-D-glucitol-2,5-nitrate), which is taken both acutely and prophylactically against angina pectoris and cardiac insufficiency.

d) Pentaerythrityl nitrates, a group of organic nitrates, are known to exert long-term antioxidant and anti-atherogenic effects by currently unidentified mechanisms. Pentaerythrityl tetranitrate has been investigated in the context of nitrate tolerance, an unwanted development in nitrate therapy, and experimentally tested in pulmonary hypertension.

A number of these nitrate compounds, as well as other nitrate and nitrite compounds, have been tested in vivo and found to generate NO. For example, glyceryl trinitrate, ethyl nitrite, isobutyl nitrate, isobutyl nitrite, isoamyl nitrite and butyl nitrite have been tested in a rabbit model and were found to give a significant correlation between the in vivo generation of NO and effects on blood pressure (Cederqvist et al., *Biochem. Pharmacol.*, 1994, 47, 1047-53).

Accordingly, it has been suggested that certain organic nitrites have utility in treating male impotence and erectile dysfunction through topical or intracavernosal administration to the penis (see U.S. Pat. No. 5,646,181).

Relatively recently, the role of dietary nitrates and nitrites has been re-evaluated, particularly as the endogenous production of NO in the arginine-nitric oxide system and its role in host defense has been discovered (Larsen et al., *N. Eng. J. Med*, 2006, 355, 2792-3). Hence, L-arginine, and esters thereof, such as the ethyl-, methyl- and butyl-L-arginine have been used to increase the endogenous production of NO.

WO 2006/031191 describes compositions and methods for use in the therapeutic delivery of gaseous nitric oxide. Such compositions for the delivery of the gaseous NO comprise a compound capable of forming a reversible bond or association to NO, such as alcohols, carbohydrates and proteins.

WO 2007/106034 describes methods for producing organic nitrites from a compound which is a mono/polyhydric alcohol, or an aldehyde- or ketone-derivate thereof. The methods involve the de-aeration of an aqueous solution of said compound, followed by purging with gaseous nitric oxide (NO).

Nilsson, K. F. et al., *Biochem Pharmacol.*, 82(3), 248-259 (2011) discusses the formation and identification of new bioactive organic nitrites.

Despite recent advances, there are a number of disadvantages associated with the compounds, compositions and preparation methods of the prior art.

For example, among the compounds and compositions presently available, many are associated with undesired properties or side-effects, such as toxicity problems, delayed action, irreversible action or prolonged action, etc. One particular problem, frequently encountered when administering a NO-donating compound in the form of an infusion, is the production of methemoglobin (metHb).

Furthermore, known organic nitrites and their therapeutic use are frequently associated with problems likely to be due to impurities and degradation products present in the compositions. It is also difficult to prepare pharmaceutical formulations containing organic nitrites, as the mixing steps and vehicles used may trigger further degradation.

Additionally, using inhaled nitric oxide and oxygen has significant problems due to the production of nitrogen dioxide, which must be monitored continuously during administration.

Some preparation methods of the prior art provide only a relatively low concentration of organic nitrite in aqueous solution, meaning that the storage and transportation properties of such formulations are often less than satisfactory.

In addition, the preparation methods of the prior art result in significant quantities of NO gas and inorganic nitrite dissolved in solution, in addition to the desired organic nitrite. Due to the highly reactive properties of NO, it is necessary to handle and store the solution carefully in order to avoid sudden and spontaneous decomposition. It is also likely that NO gas reacts with plastic materials in the storage container.

Furthermore, the presence of inorganic nitrites increase the metHb fraction of the blood, which is a dose-limiting side effect.

There exists therefore a significant and urgent need for a method for the preparation of NO-delivering compounds and compositions comprising the same which overcomes one or more of the disadvantages associated with the preparation methods and compositions of the prior art. There also exists a need for a method allowing for the use of compounds and compositions obtained from such processes.

DESCRIPTION OF THE INVENTION

The present inventors have unexpectedly found a process for the preparation of an NO-delivering compound that overcomes one or more of the disadvantages associated with the preparation methods of the prior art.

For example, the process of the invention provides a relatively high concentration of the compounds of the invention in solution, thereby providing ease of handling and minimising storage volumes and transportation costs. Furthermore, the process of the invention does not result in dissolved nitric oxide gas or inorganic nitrite, thereby minimising the risk of sudden and spontaneous decomposition, and reducing the potential for side effects when the product of the process is used in therapy. The process of the invention also results in only very low levels of other impurities being produced.

Furthermore, the present inventors have found that such processes may deliver chemically stable, non-aqueous compositions and formulations comprising these compounds, which may allow for convenient transport and storage prior to therapeutic use. Additionally, the present inventors have developed a convenient means for use of such compositions and formulations through administration in combination with a suitable aqueous buffer.

Processes

In a first aspect of the present invention, there is provided a process for the preparation of a composition comprising one or more compounds of formula I

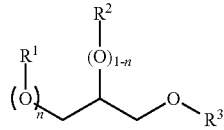

wherein:
$R^1$, $R^2$ and $R^3$ each independently represent H or —NO;
n is 0 or 1;
wherein when n is 0 then $R^1$ is H, and when n is 1 the $R^2$ is H; and
provided that at least one of $R^1$ $R^2$ and $R^3$ represents —NO,
said process comprising the step of:
(i) reacting a corresponding compound of formula I but wherein $R^1$, $R^2$ and $R^3$ represent H with a source of nitrite, optionally in the presence of a suitable acid, wherein:
(a) when the source of nitrite is an organic nitrite, step (i) is performed in a suitable organic solvent; and
(b) when the source of nitrite is an inorganic nitrite, step (i) is performed in a bi-phasic solvent mixture comprising an aqueous phase and a non-aqueous phase,
which process may hereinafter be referred to as the "process of the invention", or the like.

For the avoidance of doubt, the product of the process of the invention (i.e. the compound of formula I) may also (or instead) be referred to as a mono- and bis-nitrosylated 1,2-propanediol or 1,3-propanediol (or a mixture of such compounds, i.e. a composition comprising one or more mono- or bis-nitrosylated 1,2- or 1,3-propanediol).

For the avoidance of doubt, the corresponding compound of formula I, but wherein $R^1$, $R^2$ and $R^3$ represent H, may be referred to as a corresponding 1,2-propanediol and/or 1,3-propanediol (i.e. corresponding to the structure of the desired product), which may in turn be referred to as the starting material for the process of the invention. Put another way, the corresponding compound of formula I may be a compound according to formula (Ia) as defined below.

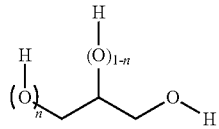

For the avoidance of doubt, where the integer (n or 1-n) as relating to the oxygen atoms is 0, no oxygen atom is present and the substituent $R^1$ and $R^2$ (and the corresponding H in the compound of formula (Ia)) is bonded to the respective carbon.

The skilled person will understand that references herein to the process of the invention (or, similarly, to "processes of the invention" or the like) will include references to all embodiments and particular features thereof.

Unless otherwise indicated, all technical and scientific terms used herein have the same meaning as commonly understood by one of ordinary skill in the art to which this invention pertains.

All embodiments of the invention and particular features mentioned herein may be taken in isolation or in combination with any other embodiments and/or particular features mentioned herein (hence describing more particular embodiments and particular features as disclosed herein) without departing from the disclosure of the invention.

As used herein, the term "comprises" will take its usual meaning in the art, namely indicating that the component includes but is not limited to the relevant features (i.e. including, among other things). As such, the term "comprises" will include references to the component consisting essentially of the relevant substance(s).

As used herein, unless otherwise specified the terms "consists essentially of" and "consisting essentially of" will refer to the relevant component being formed of at least 80% (e.g. at least 85%, at least 90%, or at least 95%, such as at least 99%) of the specified substance(s), according to the relevant measure (e.g. by weight thereof). The terms "consists essentially of" and "consisting essentially of" may be replaced with "consists of" and "consisting of", respectively.

For the avoidance of doubt, the term "comprises" will also include references to the component consisting of the relevant substance(s).

As such, the skilled person will understand that references to the preparation of a composition comprising one or more compounds of formula (I) will refer to the preparation of a composition that contains, as a constituent part, an amount of one or more compounds the structure of which is as defined in formula I, optionally together with other compounds. The process of the invention may also be referred to a process for preparing compounds of formula I (i.e. a process for preparing one or more compounds of formula I).

The skilled person will understand that references to the process being a process for preparing compounds of formula I will be understood to indicate that the process of the invention may result in the preparation of one or more types of compound each as described by formula I as defined herein (e.g. where more than one such compound is present, as a mixture thereof).

As such, the skilled person will also understand that the compounds formed in the process of the invention may take the form of a mixture of each mono-nitrite and the di-nitrite products, with the relative amounts of each varying depending on the concentration of compounds of formula I.

In particular, the process of the invention may allow for the preparation of a composition wherein at least 50 wt. %, 60 wt. %, 70 wt. % or 80 wt. % (such as at least 90 wt. % or at least 99 wt. %, e.g. at least 99.9 wt. %) of the compounds of formula I are mono-nitrosylated, such that $R^1$, $R^2$ and $R^3$ each independently represent H or —NO, provided that one of $R^1$, $R^2$ or $R^3$ represents —NO and the other groups represent H.

In particular, the process of the invention may result in the preparation of the composition that comprises one or more compounds of formula I together with one or more corresponding compounds of formula I but wherein $R^1$, $R^2$ and $R^3$ represent H (i.e. 1,2-propanediol and/or 1,3-propanediol, e.g. unreacted 1,2-propanediol and/or 1,3-propanediol starting material), and optionally other compounds.

In certain embodiments, the process of the invention may be a process for preparing a composition consisting essentially of one or more compounds of formula I, and one or more corresponding compounds of formula I but wherein $R^1$, $R^2$ and $R^3$ represent H (i.e. 1,2-propanediol and/or 1,3-propanediol; e.g. as a mixture thereof).

The skilled person will understand that the term "reacting" will refer to bringing the relevant components together in a manner (e.g. in suitable state and medium) such that a chemical reaction occurs. In particular, the reference to reacting the starting material (i.e. 1,2-propanediol and/or 1,3-propanediol) with a source of nitrite will refer to a chemical reaction between the starting material and the nitrite (i.e. the nitrite provided by the source of nitrite).

The skilled person will understand that the reference to "a source of nitrite" may instead refer simply to "nitrite", as it is the nitrite provided by the source of nitrite which undergoes chemical reaction. As such, references to a source of nitrite will be understood to refer to a compound that provides, for reaction, a nitrite moiety (which may be present either in ionic or covalently bonded form, depending on the source of nitrite present). The source of nitrite may therefore be referred to as a source of reactive (or reactable) nitrite (or nitrite moiety). For the avoidance of doubt, the source of nitrite may be an inorganic nitrite or an organic nitrite.

As indicated herein, when the source of nitrite is an organic nitrite, step (i) is performed in a suitable organic solvent.

The skilled person will understand that various organic nitrites may be used in the process of the invention, such as alkyl nitrites.

Particular alkyl nitrites that may be mentioned include ethyl nitrite, propyl nitrites, butyl nitrites and pentyl nitrites. In particular embodiments, the alkyl nitrite is n-butyl nitrite, isobutyl nitrite or tert-butyl nitrite, such as tert-butyl nitrite.

Where the source of nitrite is an organic nitrite, the skilled person will be able to select a suitable solvent. For example, suitable solvents may include those referred to herein as suitable organic components of a biphasic solvent system, and mixtures thereof.

For the avoidance of doubt, unless specified otherwise, the references to the process of the invention being performed in a suitable organic solvent do not indicate that other non-organic solvents, such as water, may be present.

In a particular embodiment, where the process of the invention is performed in a suitable organic solvent, the solvent may be essentially water free (which may be referred to as a being "water free" or "dry"), which may indicate that the solvent contains less than about 1% (e.g. less than about 0.1%, such as less than about 0.01%) by weight of water.

The term "about" is defined, herein, as meaning that the defined value may deviate by ±10%, such as by ±5%, for example by ±4%, ±3%, ±2%, or ±1%. The term "about" can be removed from throughout the specification without departing from the teaching of the invention.

As indicated herein, when the source of nitrite is an inorganic nitrite, step (i) is performed in a bi-phasic solvent mixture comprising an aqueous phase and a non-aqueous phase.

The skilled person will understand that the term "bi-phasic solvent mixture" as used herein will refer to a system comprised of two solvents or solvent mixtures which do not mix to form a single solvent phase but instead are present as two distinct (i.e. non-mixed) phases.

Where such solvent mixtures comprise water and an organic solvent (or mixture of organic solvents) such solvent systems may be said to comprise an "aqueous phase" and an "organic phase". For the avoidance of doubt, the term bi-phasic does not indicate that substances forming other phases, such as substances forming a solid phase, may be present in addition to the solvent system (that is to say, other phases may also be present).

Particular sources of inorganic nitrites that may be mentioned include metal nitrites, such as alkali metal nitrites and alkaline earth metal nitrite. Ionic liquids may also be a suitable source of inorganic nitrites.

For the avoidance of doubt, the term alkali metal takes its usual meaning in the art, namely referring to IUPAC group 1 elements and cations, including lithium, sodium, potassium, rubidium, caesium and francium.

For the avoidance of doubt, the term alkaline earth metal takes its usual meaning in the art, namely referring to IUPAC group 2 elements and cations, including beryllium, magnesium, calcium, strontium, barium and radium.

More particular inorganic nitrites that may be mentioned include alkali metal nitrites, such as lithium nitrite, sodium nitrite and potassium nitrite. In a particular embodiment, the source of nitrite is sodium nitrite.

Alternatively, the metal nitrite may be an alkaline earth metal nitrite, such as lithium nitrite, magnesium nitrite or calcium nitrite.

For the avoidance of doubt, the skilled person will understand that the non-aqueous phase in the bi-phasic solvent system may be an organic solvent, which may therefore be referred to as an organic phase.

The skilled person will be able to select a suitable non-aqueous (i.e. organic) solvent based on the properties of the aqueous phases. For example, where the aqueous phase has a certain level of substances dissolved therein (e.g. ionic solids, such as salts), a wide-range of organic solvents may be selected in order to form a bi-phasic solvent system.

In particular embodiments, the non-aqueous phase consists of a water immiscible organic solvent. In more particular embodiments, the water immiscible organic solvent is an aprotic organic solvent.

Particular water immiscible organic solvents (i.e. particular solvents forming the non-aqueous phase) that may be mentioned include ethers (e.g. tert-butyl methyl ether, cyclopentyl methyl ether, methyl tetrahydrofuran, diethyl ether, diisopropyl ether) and dichloromethane (DCM).

More particular water immiscible organic solvents (i.e. particular solvents forming the non-aqueous phase) that may be mentioned include dichloromethane, diethyl ether and tert-butyl methyl ether. In more particular embodiments, the water immiscible organic solvent is tert-butyl methyl ether.

In certain embodiments that may be mentioned, the solvent mixture may comprise excess compounds of formula I but wherein $R^1$, $R^2$ and $R^3$ represent H (i.e. 1,2-propanediol and/or 1,3-propanediol). For the avoidance of doubt, in such circumstances, the 1,2-propanediol and/or 1,3-propanediol (i.e. the compounds of formula I but wherein $R^1$, $R^2$ and $R^3$ represent H) may be present as both a solvent (e.g. a component of a solvent mixture) and a reagent. As such, in particular embodiments, the process is a process for preparing compounds of formula I as a solution in corresponding compounds of formula I but wherein $R^1$, $R^2$ and $R^3$ represent H, i.e. 1,2-propanediol and/or 1,3-propanediol (e.g. in the form of a mixture comprising 1,2-propanediol and/or 1,3-propanediol, as appropriate). In certain embodiments, when the source of nitrite is an organic nitrite, the solvent may consist essentially of compounds of formula I but wherein $R^1$, $R^2$ and $R^3$ represent H (i.e. 1,2-propanediol and/or 1,3-propanediol). That is to say, the compounds of formula I but wherein $R^1$, $R^2$ and $R^3$ represent H may act both as solvent and as reactant.

In an alternative embodiment, when the source of nitrite is an inorganic nitrite, step (i) may be performed in a single solvent, wherein the solvent may consist essentially of compounds of formula I but wherein $R^1$, $R^2$ and $R^3$ represent H (i.e. 1,2-propanediol and/or 1,3-propanediol). That is to say, the compounds of formula I but wherein $R^1$, $R^2$ and $R^3$ represent H may act both as solvent and as reactant.

In alternative embodiments, the process of the invention may be performed with an excess of nitrite relative to the starting material of formula I but wherein $R^1$, $R^2$ and $R^3$ represent H (i.e. 1,2-propanediol and/or 1,3-propanediol).

As used herein, the term "excess" will take its usual meaning in the art, namely indicating that the component is present in a greater than stoichiometric amount for the reaction in which it is a reagent.

As indicated herein, the process of the invention (in particular, the reaction between components) is optionally performed in the presence of a suitable acid.

Particular processes of the invention that may be mentioned include those wherein the step of reacting the starting material (i.e. 1,2-propanediol and/or 1,3-propanediol) with a source of nitrite is carried out in the presence of a suitable acid.

Particular acids that may be mentioned as suitable acids include Brønsted acids (i.e. proton donor acids), more particularly wherein such acids may be referred to as a strong acid.

For the avoidance of doubt, the term "strong acid" takes its usual meaning in the art, referring to Brønsted acids whose dissociation is substantially complete in aqueous solution at equilibrium. In particular, references to strong acids may refer to Brønsted acids with a pKa (in water) of less than about 5 (for example, less than about 4.8). For the avoidance of doubt, for multiprotic acids, such as sulphuric acid, the term strong acid refers to the dissociation of the first proton.

Certain strong acids that may be mentioned include those with a pKa (in water) of less than about 1, such as less than about 0 (e.g. less than about −1 or −2). For example, strong acids that may be mentioned include those with a pKa (in water) of about −3. The skilled person will understand that suitable acids may include non-nucleophilic acids, as known to those skilled in the art.

Particular suitable acids that may be mentioned include sulphuric acid, phosphoric acid, trifluoroacetic acid and acetic acid.

More particular suitable acids that may be mentioned include mineral acids (e.g. strong mineral acids), such as sulphuric acid.

The skilled person will be able to select suitable amounts of reagents to use in the process of the invention within the teaching of the present invention. For example, the ratio (i.e. the molar ratio) of corresponding compound of formula I but wherein $R^1$, $R^2$ and $R^3$ represent H to nitrite to acid (where present) may be about 1:from about 1 to about 5:to about 0.5 to about 3.5, for example about 1:from about 1 to about 3:from about 0.5 to about 2 (such as about 1:4:2.7, or about 1:2:0.95, or about 1:2:1). For the avoidance of doubt, where a suitable acid is not present, the ratios between the corresponding compound of formula I but wherein $R^1$, $R^2$ and $R^3$ represent H and nitrite may still apply.

In particular embodiments, process step (i) is carried out at a temperature of from about −30° C. to about 5° C., such as from about −30° C. to about 0° C., for example from about −30° C. to about −10° C., preferably from about −25° C. to about −15° C.

In particular embodiments, process step (i) is carried out under an inert atmosphere, such as a nitrogen or argon atmosphere, preferably an argon atmosphere. Furthermore, in particular embodiments any steps of the process may be carried out under an inert atmosphere, such as a nitrogen or argon atmosphere, preferably an argon atmosphere.

Particular processes of the invention that may be mentioned, particularly in which a bi-phasic solvent system is used, include those wherein the process further comprises, after (e.g. directly following) step (i), the step of:
(ii) removing substantially all of the aqueous phase (i.e. removing substantially all water) from the solvent mixture.

The skilled person will appreciate that the aqueous phase may be removed from the solvent mixture by any suitable process and using any suitable equipment as known in the art (for example, by using a separating funnel or similar apparatus).

As used herein, unless otherwise specified the term "substantially all" will refer to at least 80% (e.g. at least 85%, at least 90%, or at least 95%, such as at least 99%) of the specified substance(s), according to the relevant measure (e.g. by weight thereof).

The skilled person will also understand that references to "removing substantially all of the aqueous phase from the solvent mixture" may be replaced with references to "removing some or all of the aqueous phase from the solvent mixture" or simply "removing the aqueous phase from the solvent mixture".

For the avoidance of doubt, in the context of its removal, the term aqueous phase will refer to the (separate) phase formed from water and components dissolved therein.

Particular processes of the invention that may be mentioned, particularly in which a bi-phasic solvent system is used, include those wherein the process further comprises, after (e.g. directly following) step (i), the steps of (in the sequence shown):
(ii) removing some or all (e.g. substantially all) of the aqueous phase (i.e. of water);
(iii) washing the remaining organic phase with one or more further aqueous phase;
(iv) optionally repeating steps (ii) and (iii) one or more times.

Further processes of the invention that may be mentioned, particularly in which a bi-phasic solvent system is used, include those wherein the process further comprises, after (e.g. directly following) step (i), the steps of (in the sequence shown):
(ii) removing some or all (e.g. substantially all) of the aqueous phase (i.e. of water);
(iii) washing the remaining organic phase with one or more further aqueous phase;
(iv) optionally repeating steps (ii) and (iii) one or more times;
(v) optionally reducing (i.e. reducing the amount/volume of) the organic phase, such as by removal some or substantially all of the water immiscible organic solvent (e.g. organic solvent other than 1,2 propanediol and/or 1,3-propanediol), and
(vi) optionally drying the product,
wherein steps (ii) to (vi) may be performed in any order provided that steps (ii) to (iv) are performed before steps (v) and (vi).

In particular embodiments, process steps (ii) to (iv) may be carried out at a temperature of from about −20° C. to about 5° C., such as from about −10° C. to about 5° C.

In particular embodiments, process step (v) may be carried out at a temperature of from about 0° C. to about 30° C., such as from about 10° C. to about 30° C., for example from about 15° C. to about 30° C.

In particular embodiments, process step (v) is carried out for no more than 6 hours, for example no more than 5 hours, preferably no more than 4 hours.

In particular embodiments, each of steps (ii) to (vi) are performed, such as wherein those steps are performed in the order indicated.

For the avoidance of doubt, the skilled person will understand that washing the remaining organic phase with one or more further aqueous phase will refer to steps comprising: adding a further portion of aqueous solvent (e.g. water); mixing with the (separate) organic phase (e.g. by stirring and/or shaking together); and removing substantially all of the aqueous phase, and optionally repeating said steps one or more times.

The skilled person will understand that step (iii) may be performed by any suitable process and using any suitable equipment known in the art (for example, using a separating funnel).

The skilled person will understand that step (v) may be performed by any suitable process and using any suitable equipment known in the art (for example, by evaporation under reduced pressure).

In the context of step (v), references to removal of the some of the organic phase may refer in particular to removal of substantially all of the water immiscible organic solvent, as defined herein. More particularly, removal of the water immiscible organic solvent may refer to removal of at least 99% (such as at least 99.5%, 99.9% or, in particular, 99.99%) by weight of the water immiscible organic solvent.

Such removal of the water immiscible organic solvent may also refer to removal such that the product following such removal contains less than 1% (such as less than 0.5%, 0.1%, e.g. less than 0.05%, less than 0.01%) by weight of the water immiscible organic solvent.

For the avoidance of doubt, in the context of step (v), references to removal of the organic phase, such as the water immiscible organic solvent, will refer to the removal of any such solvents as defined herein (e.g. the removal of dichloromethane or tert-butyl methyl ether). Where further organic solvents are present (such as those which are not water immiscible, e.g. excess 1,2-propanediol and/or 1,3-propanediol acting as a solvent) a portion of such solvents may be also removed (e.g. together with a water immiscible organic solvent).

In the context of steps (vi), references to drying the product will refer to the removal of water from the material remaining after preceding steps. Such removal of water may refer to removal such that the product following such drying contains less than 1% (such as less than 0.5% or less than 0.1%, e.g. less than 0.05% or less than 0.01%) by weight of water.

The skilled person will understand that step (vi) may be performed by any suitable process and using any suitable equipment known in the art (for example, by contacting the remaining organic phase with a suitable drying agent, such as anhydrous sodium sulphate, anhydrous magnesium sulphate and/or molecular sieves).

Particular processes of the invention that may be mentioned include those wherein the process further comprises the step (e.g. after step (i) and, if present, other steps as described herein) of adding a further amount of corresponding compound of formula I but wherein $R^1$, $R^2$ and $R^3$ represent H (i.e. 1,2-propanediol and/or 1,3-propanediol), such that the combined mixture of the one or more compounds of formula I and corresponding compounds of formula I but wherein $R^1$, $R^2$ and $R^3$ represent H (i.e. 1,2-propanediol and/or 1,3-propanediol) comprises from about 0.01% to about 9% (e.g. about 0.01% to about 5%, such as about 3% to about 5%, or about 5% to about 7%) by weight of the one or more of the compounds of the invention.

As outlined above, all embodiments of the invention and particular features mentioned herein may be taken in isolation or in combination with any other embodiments and/or particular features mentioned herein (hence describing more particular embodiments and particular features as disclosed herein) without departing from the disclosure of the invention.

For example: the process step (i) being carried out at a temperature of from about −30° C. to about 5° C. may be combined with the feature of the process steps (ii) to (iv) may be carried out at a temperature of from about −20° C. to about 5° C.; the feature of the process step (v) being carried out at a temperature of from about 0° C. to about 30° C.; and/or the feature of process step (v) being carried out for no more than 6 hours.

More particular processes that may be mentioned include those wherein the parameters specified are in accordance with the examples provided herein.

A particular product of the process of the invention is a compound according to formula (II)

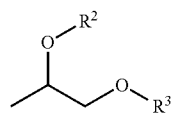

(II)

wherein $R^2$ and $R^3$ each independently represent H or —NO, provided that at least one of $R^2$ and $R^3$ represents —NO, wherein the process comprises the step of reacting 1,2-propanediol (i.e. the starting material) with a source of nitrite, under conditions as described herein (including all embodiments thereof).

Two enantiomers of the compound according to formula (II) exist, being the R and S form as depicted below:

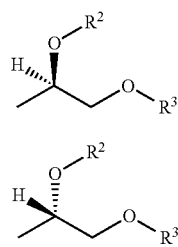

(II) R form (II) S form

A further particular product of the process of the invention is a compound according to formula (III) as depicted below:

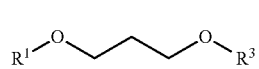

(III)

wherein $R^1$ and $R^3$ each independently represent H or —NO, provided that at least one of $R^1$ and $R^3$ represents —NO, wherein the process comprises the step of reacting 1,3-propanediol with a source of nitrite.

The two particular processes depicted above for the production of compounds according to formula (II) and (III) may be carried out together or independently of one another.

Based on the occurring biphasic nature of the reaction mixture, optional addition of a phase-transfer catalyst (PTC) may support the product formation. Common PTCs are for example, but not limited to, tetraalkylammonium ions, such as Me$_4$N+, Et$_4$N+, Bu$_4$N+, or Bu$_3$(N+)CH$_2$PHCl, with counterions such as =Cl—, Br—, HSO$_4$—, or other types of alkylammonium PTCs such as Aliquat® 336, in substoichiometric amounts of <1 equivalent, for example, but not exclusively, in the range of about 0.05 to about 40 mol %, such as about 0.1 to about 30 mol %, for example of about 0.1 to about 20 mol %.

A further particular product of the process of the invention is a compound according to formula (IV) as depicted below

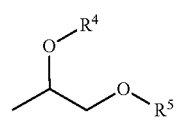

(IV)

wherein $R^4$ and $R^5$ each independently represent H or —NO, provided that at least one of $R^4$ and $R^5$ represents —NO.

A particular process of the invention, therefore, is for the preparation of a composition comprising one or more compounds of formula (IV)

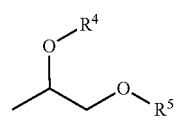

(IV)

wherein $R^4$ and $R^5$ each independently represent H or —NO, provided that at least one of $R^4$ and $R^5$ represents —NO, said process comprising the step of:
 (i) reacting 1,2-propanediol with a source of nitrite, optionally in the presence of a suitable acid, wherein:
  (a) when the source of nitrite is an organic nitrite, step (i) is performed in a suitable organic solvent; and
  (b) when the source of nitrite is an inorganic nitrite, step (i) is performed in a bi-phasic solvent mixture comprising an aqueous phase and a non-aqueous phase.

Any of the process steps outlined herein may be combined with the particular process described above with respect to formula (IV) and particular embodiments are outlined below.

In a particular process the inorganic nitrite is a metal nitrite, optionally wherein the metal nitrite is an alkali metal nitrite or an alkaline earth metal nitrite, preferably an alkali metal nitrite.

In a particular embodiment the alkali metal nitrite is sodium nitrite.

In a further particular embodiment the organic nitrite is an alkyl nitrite, such as tert-butyl nitrite.

In a particular process the suitable acid is a strong acid, such as a strong mineral acid (e.g. sulphuric acid).

In a particular embodiment the non-aqueous phase comprises a water immiscible organic solvent, such as a water immiscible aprotic organic solvent.

In an embodiment the water immiscible organic solvent is dichloromethane.

In a particular process, the solvent mixture further comprises excess 1,2-propanediol.

In a further particular process, after step (i) the process further comprises the step of:
(ii) removing substantially all of the aqueous phase from the solvent mixture.

In an embodiment, after step (i) the process further comprises the step(s) of:
(ii) removing some or all (e.g. substantially all) of the aqueous phase (i.e. of water);
(iii) washing the remaining organic phase with one or more further aqueous phase;
(iv) optionally repeating steps (ii) and (iii) one or more times;
(v) optionally reducing (i.e. reducing the amount/volume of) the organic phase, and
(vi) optionally drying the product,
wherein steps (ii) to (vi) may be performed in any order provided that steps (ii) to (iv) are performed before steps (v) and (vi).

In a particular embodiment, the process further comprises the step of adding a further amount of 1,2-propanediol, such that the combined mixture of the one or more compounds of formula I and 1,2-propanediol comprises from about 0.01% to about 9% by weight of the one or more compounds of formula IV.

Products and Compositions

In a second aspect of the invention, there is provided a product prepared using (such as a product obtained or obtainable by) the process of the invention (i.e. produced according to the first aspect of the invention, including all embodiments and particular features therein), which products may be referred to hereinafter as "compounds of the invention".

Compounds of the invention may contain an asymmetric carbon atom as outlined above and will therefore exhibit optical isomerism. The various stereoisomers may be isolated by separation of a racemic or other mixture of the compounds using convention, e.g. fractional crystallisation or HPLC, techniques. Alternatively, the desired optical isomers may be made by reaction of the appropriate optically active starting materials under conditions which will not cause racemisation (i.e. a 'chiral pool' method), by reaction of the appropriate starting material with a 'chiral auxiliary' which can be subsequently removed at a suitable stage, by derivatisation (i.e. a resolution, including dynamic resolution); for example, with a homochiral acid followed by separation of the diastereomeric derivatives by convention means such as chromatography, or by reaction with an appropriate chiral reagent or chiral catalyst under conditions known to the skilled person. All stereoisomers and mixtures thereof are included within the scope of the invention.

The processes of the invention advantageously allow the preparation of substantially non-aqueous compositions comprising one or more compounds of the invention. In particular, the processes of the invention allow for relatively high concentrations of the one or more compounds of the invention in the composition, thereby providing ease of handling and minimising storage volumes and transportation costs.

Accordingly, in a third aspect of the invention, there is provided a substantially non-aqueous composition comprising:
(a) one or more compounds of formula I as defined herein; and
(b) one or more corresponding compounds of formula I but wherein $R^1$, $R^2$ and $R^3$ represent H (e.g. 1,2-propanediol and/or 1,3-propanediol), which compositions may be referred to hereinafter as "the substantially non-aqueous compositions of the invention".

The skilled person will understand that references herein to substantially non-aqueous compositions of the invention will include references to all embodiments and particular forms thereof.

As used herein, references to "substantially non-aqueous" will refer to the component comprising less than 1% (such as less than 0.5% or less than 0.1%, e.g. less than 0.05%, less than 0.01%) by weight of water.

Particular substantially non-aqueous compositions of the invention that may be mentioned include those wherein the composition comprises from about 0.01% to about 9% (e.g. about 0.01% to about 5%, such as about 3% to about 5%, or about 5% to about 7%) by weight of the one or more of the compounds of the invention (i.e. compounds of formula I).

Particular substantially non-aqueous compositions of the invention that may be mentioned include those wherein the composition comprises a compound according to formula (II). Preferably the compound according to formula (II) is the S form.

The S form of the compound according to formula (II) is preferred as this has a higher rate of metabolism than the R form. Furthermore, the S form has a different metabolic degradation route, which results in metabolites which are less toxic than those from the R form.

Particular substantially non-aqueous compositions of the invention that may be mentioned include those wherein the composition comprises a compound according to formula (III).

Preferably the compound according to formula (II) is the S form, although it is envisaged that the product is a mixture of both the S and R form of formula (II) with the S form preferably being present in an enantiomeric excess (ee).

In particular embodiments, where the product of the process is a compound according to formula (II), the compound according to formula (II) may be in an enantiomeric excess of the S form of the compound. That is to say, greater than 50 ee % of the product is in the S form, such as greater than, or equal to, 60 ee %, 70 ee %, 80 ee %, 90 ee %, 95 ee % or 98 ee % of the product is the S form.

In order to arrive at an enantiomeric excess of the S form of compound (II), in an embodiment the starting material (i.e. the 1-2 propanediol) may be present in an enantiomeric excess of the S form. That is to say, greater than, or equal to, 50 ee % of the starting material (i.e. the 1-2 propanediol) is in the S form, such as greater than, or equal to, 60 ee %, 70 ee %, 80 ee %, 90 ee %, 95 ee %, or 98 ee % of the starting material is the S form.

In an embodiment where the product is a mono-nitrosylated compound according to formula (II), greater than 50 wt. % of the product is nitrosylated in the 2 position (i.e. $R^2$ is —NO), such as between about 55 wt. % and about 80 wt. % is nitrosylated in the 2 position, for example between about 55 wt. % and 75 wt. %.

Particular substantially non-aqueous compositions of the invention that may be mentioned include those wherein the composition consists essentially of one or more compounds of formula I and corresponding compounds of formula I but wherein $R^1$, $R^2$ and $R^3$ represent H (i.e. 1,2-propanediol and/or 1,3-propanediol).

In particular, when the starting material is 1,2-propanediol then the substantially non-aqueous compositions of the invention may comprise (or, particularly, consist essentially of or, more particularly, consist of) one or more compounds of formula II and 1,2-propanediol.

Equally, when the starting material is 1,3-propanediol then the substantially non-aqueous compositions of the invention may comprise (or, particularly, consist essentially of or, more particularly, consist of) one or more compounds of formula III and 1,3-propanediol.

By the term "consist essentially of", this means that at least 90 wt. % of the defined feature is present, such as at least 95 wt. %, 96 wt. %, 97 wt. %, 98 wt. % or 99 wt. % of the defined feature is present.

Furthermore, particular substantially non-aqueous compositions of the invention that may be mentioned include those wherein the composition comprises (or, particularly, consists essentially of or, more particularly, consists of) one or more compounds of formula (II) and (III) along with 1,2-propanediol and 1,3-propanediol.

Particular substantially non-aqueous compositions of the invention that may be mentioned include those wherein the composition is substantially free of dissolved nitric oxide.

By the term "substantially free", this means that the non-aqueous compositions of the invention comprise less than 5 wt. %, 4 wt. %, 3 wt. %, 2 wt. % or 1 wt. % of dissolved nitric oxide, such as less than 0.5 wt. % or 0.1 wt. %.

Furthermore, particular substantially non-aqueous compositions of the invention may comprise:
(a) one or more compounds of formula IV

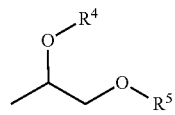

(IV)

wherein $R^4$ and $R^5$ each independently represent H or —NO, provided that at least one of $R^4$ and $R^5$ represents —NO; and
(b) 1,2-propanediol.

Compounds of the invention and substantially non-aqueous compositions of the invention are useful as pharmaceuticals. Such compounds may be administered alone or may be administered by way of known pharmaceutical compositions/formulations.

Accordingly, in a fourth aspect, there is provided a pharmaceutical formulation comprising a substantially non-aqueous composition of the invention and optionally one or more pharmaceutically acceptable excipients, which formulations may be hereinafter referred to "pharmaceutical formulations of the invention".

The skilled person will understand that references herein to pharmaceutical formulations of the invention will include references to all embodiments and particular forms thereof.

As used herein, the term pharmaceutically-acceptable excipients includes references to vehicles, adjuvants, carriers, diluents, pH adjusting and buffering agents, tonicity adjusting agents, stabilizers, wetting agents and the like. In particular, such excipients may include adjuvants, diluents or carriers.

Particular pharmaceutical formulations of the invention that may be mentioned include those wherein the pharmaceutical formulation comprises at least one pharmaceutically acceptable excipient.

Particular pharmaceutical formulations of the invention that may be mentioned include those wherein the one or more pharmaceutically acceptable excipients are substantially non-aqueous.

For the avoidance of doubt, references herein to compounds of invention being for particular uses (and, similarly, to uses and methods of use relating to compounds of the invention) may also apply to compositions and pharmaceutical formulations comprising compounds of the invention, as described herein.

It has been surprisingly found that the compounds of the invention may be administered to a patient (i.e. a subject) in conjunction with a suitable aqueous buffer. In particular, it has been unexpectedly found that the compounds of the invention are suitably stable (e.g. existing without significant degradation for at least 15 minutes) in aqueous buffers, more particularly wherein the aqueous buffer is non-nucleophilic and weakly basic.

According to a fifth aspect of the invention, there is provided a kit-of-parts comprising:
(A) a pharmaceutical formulation of the invention (i.e. in the fourth aspect of the invention, including all embodiments and particular features therein); and
(B) a suitable aqueous buffer,
wherein components (A) and (B) are provided in a form suitable for administration with each other,
which kits-of-parts are referred to hereinafter as "kits-of-parts of the invention".

Particular embodiments that be mentioned include those wherein the buffer is non-nucleophilic and weakly basic.

More particular embodiments that may be mentioned include those wherein the buffer has a pH of from about 7.1 to about 10 (e.g. about 8 or about 9.2), such as a carbonate (e.g. $NaHCO_3$, which may be at a pH of about 7.4 or about 8.0) buffer or a physiological phosphate buffer (optionally at a pH of 8), or a mixture thereof. Physiological saline may also be used as a buffer.

In particular, the buffer may be a buffer as used in Example 5 as described herein below, such as a carbonate buffer with pH 9.2 or a phosphate buffer with pH 8.0 (e.g. a 0.154 molar buffer), or a $NaHCO_3$ buffer with pH 8.0.

According to a sixth aspect of the invention, there is provided a combination product formed by mixing together:
(A) a pharmaceutical formulation of the invention (i.e. in the fourth aspect of the invention, including all embodiments and particular features therein); and
(B) a suitable aqueous buffer as defined in the fifth aspect of the invention (including all embodiments and particular features therein),
which combination product is referred to hereinafter as "the combination product of the invention".

According to a seventh aspect of the invention, there is provided a process for preparing a combination product of the invention (i.e. in the sixth aspect of the invention, including all embodiments and particular features therein), comprising the step of mixing together:
(A) a pharmaceutical formulation of the invention (i.e. in the fourth aspect of the invention, including all embodiments and particular features therein); and
(B) a suitable aqueous buffer as defined in the fifth aspect of the invention (including all embodiments and particular features therein).

Particular kits-of-parts and combination products of the invention that may be mentioned include those wherein the ratio of the pharmaceutical formulation of the invention and the suitable aqueous buffer is from about 1:2 to 1:99, or from about 3:7 to 1:99 (e.g. about 1:3 to 1:99) by volume.

Alternatively, kits-of-parts of the invention that may be mentioned include those wherein the kit contains instructions for the mixing of the components (e.g. prior to administration, such as by using techniques as described herein)

such that the ratio of the pharmaceutical formulation of the invention and the suitable aqueous buffer is from about 3:7 to 1:99 (e.g. about 1:3 to 1:99) by volume.

Medical Uses

As discussed hereinbefore, compounds of the invention, non-aqueous compositions of the invention, pharmaceutical formulations of the invention, and therefore kits-of-parts and combination products comprising the same, are useful in the treatment of conditions wherein the administration of NO has a beneficial effect.

According to an eighth aspect of the invention, there is provided a non-aqueous composition as hereinbefore defined (i.e. in the third aspect of the invention, including all embodiments and particular features therein), a pharmaceutical formulation as hereinbefore defined (i.e. in the fourth aspect of the invention, including all embodiments and particular features therein), a kit-of-parts as hereinbefore defined (i.e. in the fifth aspect of the invention, including all embodiments and particular features therein), or a combination product as hereinbefore defined (i.e. in the sixth aspect of the invention, including all embodiments and particular features therein) for use in the treatment of a condition wherein administration of NO has a beneficial effect.

In an alternative eighth aspect of the invention, there is provided a method of treating a condition wherein administration of NO has a beneficial effect comprising administering to a patient in need thereof a therapeutically effective amount of a pharmaceutical formulation of the invention or a combination product of the invention.

In a further alternative eighth aspect of the invention, there is provided a method of treating a condition wherein administration of NO has a beneficial effect comprising administering to a patient in need thereof a therapeutically effective amount of components:

(A) a pharmaceutical formulation of the invention (i.e. in the fourth aspect of the invention, including all embodiments and particular features therein); and (B) a suitable aqueous buffer as defined in the fifth aspect of the invention (including all embodiments and particular features therein).

Particular methods that may be mentioned include those wherein the mixing of components (A) and (B) is performed immediately prior to administration to the patient, such as by co-administration thereof.

The inventors have found that administration of the compounds of the invention can cause damage to blood cells via hemolysis due to osmotic stress and these effects can be managed, or avoided, by administration of the compound of the invention in a suitable aqueous buffer.

More particular methods that may be mentioned include those wherein the mixing is performed by a mixed flow process, for example, occurring at the point of administration to the patient. Even more particular methods that may be mentioned include those wherein the mixed flow process is intravenous infusion using a Y-site connector.

The skilled person will understand that references to the treatment of a particular condition (or, similarly, to treating that condition) take their normal meanings in the field of medicine. In particular, the terms may refer to achieving a reduction in the severity of one or more clinical symptoms and/or signs associated with the condition. For example, in the case of pulmonary embolism, the term may refer to achieving reduction in the severity of chest pain, shortness of breath and/or pulmonary hypertension via vasodilation.

As used herein, references to patients will refer to a living subject being treated, including mammalian (e.g. human) patients. In particular, the term patient may refer to a human subject. The term patient may also refer to animals (e.g. mammals), such as household pets (e.g. cats and, in particular, dogs), livestock and horses.

As used herein, the term effective amount will refer to an amount of a compound that confers a therapeutic effect on the treated patient. The effect may be objective (i.e. measurable by some test or marker) or subjective (i.e. the subject gives and indication of and/or feels an effect).

As indicated herein, the pharmaceutical formulations of the invention may be useful in the treatment of a condition wherein administration of NO has a beneficial effect.

Particular conditions that may be mentioned include those selected from the group consisting of: acute pulmonary vasoconstriction of different genesis; pulmonary hypertension of different genesis, including primary hypertension and secondary hypertension; conditions of different genesis in need of vasodilation; systemic hypertension of different genesis; regional vasoconstriction of different genesis; local vasoconstriction of different genesis; acute heart failure (with or without preserved ejection fraction (HFpEF)); coronary heart disease; myocardial infarction; ischemic heart disease; angina pectoris; instable angina; cardiac arrhythmia; acute pulmonary hypertension in cardiac surgery patients; acidosis; inflammation of the airways; cystic fibrosis; COPD; immotile cilia syndrome; inflammation of the lung; pulmonary fibrosis; adult respiratory distress syndrome; acute pulmonary oedema; acute mountain sickness; asthma; bronchitis; hypoxia of different genesis; stroke; cerebral vasoconstriction; inflammation of the gastrointestinal tract; gastrointestinal dysfunction; gastrointestinal complication; IBD; Crohn's disease; ulcerous colitis; liver disease; pancreas disease; inflammation of the bladder of the urethral tract; inflammation of the skin; diabetic ulcers; diabetic neuropathy; psoriasis; inflammation of different genesis; wound healing; organ protection in ischemia-reperfusion conditions; organ transplantation; tissue transplantation; cell transplantation; acute kidney disease; uterus relaxation; cervix relaxation; disease of the eye, such as glaucoma and conditions where smooth muscle relaxation is needed.

More particular conditions that may be mentioned are pulmonary hypertension of different genesis, including primary hypertension and secondary hypertension, acute heart failure (with or without preserved ejection fraction (HFpEF)). For example, the condition may be pulmonary hypertension resulting from surgery.

Pulmonary hypertension is defined as an increase in mean pulmonary arterial pressure (mPAP) at or above 20 mmHg at rest in combination with a Wood Units value of >3.

The skilled person will be able to determine how pharmaceutical formulations, together with suitable buffers, as described herein may be administered in treatment. In particular, such combinations of pharmaceutical formulations and buffers as described herein may be administered intravenously or intraarterially.

The skilled person will be able to determine a suitable dose of active ingredients to be used in treatment based on the nature of the formulation (e.g. the combination of pharmaceutical formulation and suitable buffer as described herein) used, the condition to be treated and the status (e.g. state of illness) of the patient. For example, when administered intravenously or intraarterially to human adult a suitable dose may be about 0.5 to about 3,000 nmol/kg/min, such as about 1 to about 3,000 nmol/kg/min, for example from about 5 to about 3,000 nmol/kg/min of the compound (s) of formula I. Such doses may be administered by infusion (either continuous or pulsed), such as infusion over an extended period of time (e.g. 1 to 2 hours or even up to one week), or may be administered as a single (bolus) dose (such as a one-off dose or a single dose per treatment intervention, such as a single dose as required, or a single dose in each 24 hour period during treatment).

The skilled person will understand that the temperature at which formulations of the invention (i.e. pharmaceutical compositions comprising compounds of formula I) are formed and/or administered in treatment (i.e. administered to a subject) may be that of the environment in which administration takes place (i.e. room temperature) or may be controlled. For example, such formulations may be formed and/or administered at room temperature or at a reduced temperature (i.e. a temperature that is below room temperature), such as from about 0 to about 25° C.

In particular embodiments, the compounds of formula (II) are of particular importance for use in humans and the compounds of formula (III) are of particular importance for use in veterinary applications.

Without wishing to be bound by theory, it is believed that upon administration to a patient, the compounds of formula I are hydrolysed to release nitric oxide, which provides the desired therapeutic effect. It is believed that the processes described herein unexpectedly allow for the preparation of a suitable concentrated and stable composition comprising the required active ingredients. Furthermore, it is believed that a certain type of buffer has been unexpectedly found to allow for safe administration of such compositions without significant degradation of the active ingredient(s).

EXAMPLES

Figure 1:
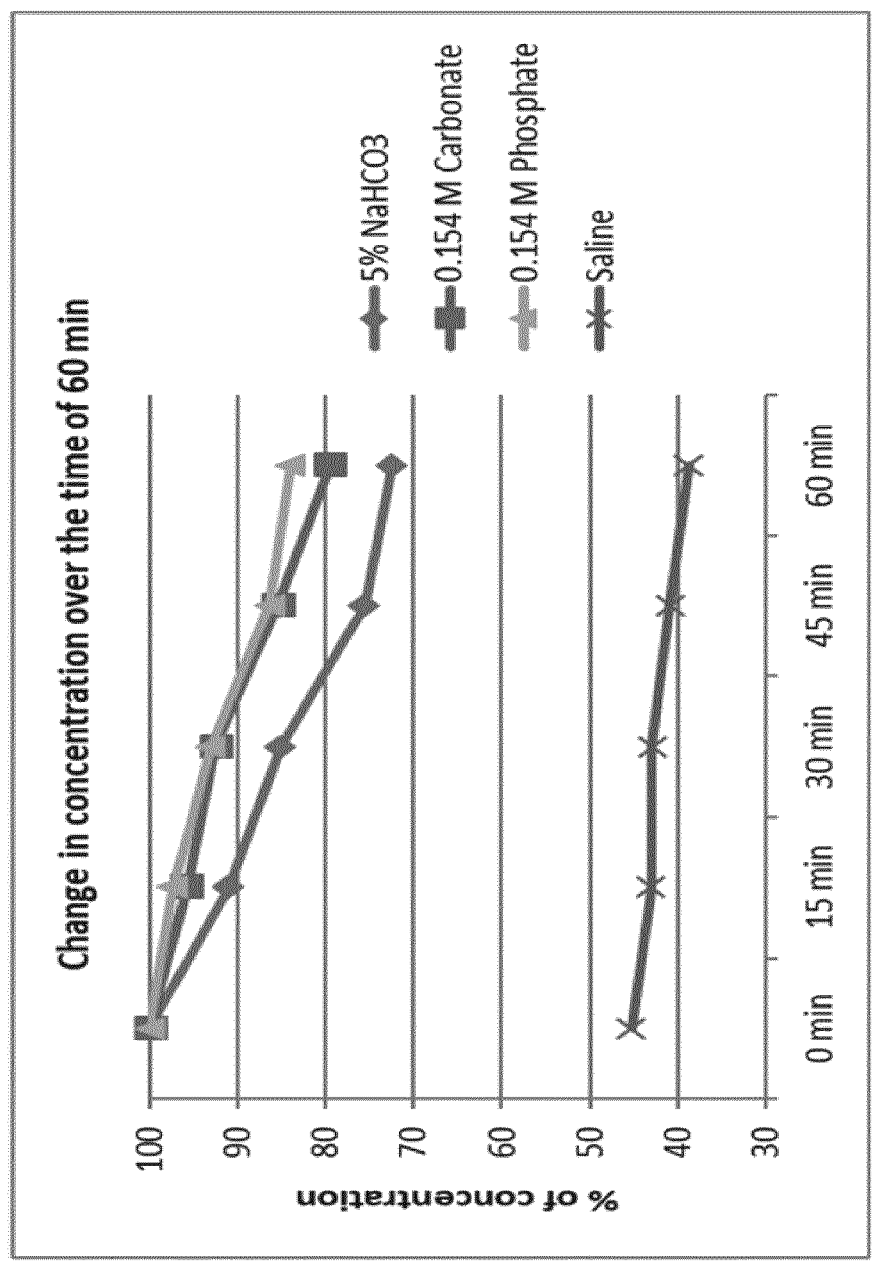
FIG. 1: Shows the results of an analysis of the stability of compositions of the invention in various buffer solutions as described in Example 5 herein.

The invention is illustrated by way of the following examples, which are not intended to be limiting on the general scope of the invention.

Abbreviations
  aq aqueous
  conc concentration
  GC gas chromatography
  NMR nuclear magnetic resonance
  equiv. equivalent(s)
  rel. vol. relative volume(s)

General Procedures

Starting materials and chemical reagents specified in the preparations described below are commercially available from a number of suppliers, such as Sigma Aldrich.

All NMR experiments were performed at 298K on a Bruker 500 MHz AVI instrument equipped with a QNP probe-head with Z-gradients using the Bruker Topspin 2.1 software. Signals were referenced to residual CHCl$_3$ at 7.27 ppm, unless stated otherwise.

Stability Assays

Assays of the stability samples were performed by GC/FID, under the following conditions. 1,4-Dioxane was used as the Internal Standard (IS; approximately 0.50 mg/ml in CH$_3$CN).

GC column: Rxi-5Sil MS, 20 m×0.18 mm, 0.72 μm
  Carrier gas: Helium
  Inlet: 200° C., split ratio 30:1
  Constant flow: 1.0 ml/min
  Oven temperature profile: 40° C. (3 min), 10° C./min, 250° C. (3 min)
  FID: temp 300° C.; H$_2$ flow 30 ml/min, Air flow 400 ml/min, make-up flow (N$_2$) 25 ml/min In Vivo Studies Prior to experimentation, ethical approval was received from Linköping's regional animal ethics committee (Linköping, Sweden; approval number 953). Anaesthetic management, surgical instrumentation and methods for measurements were recently described (Dogan et al. 2018, Sadeghi et al. 2018).

In brief, 8 male and female pigs (a crossbreed between Swedish country breed, Hampshire and Yorkshire; 3-4 months old; mean body weight 27 kg, range 21-34 kg) were premedicated with azaperone at the farm and transported to the laboratory. At the laboratory, anaesthesia was induced with a mixture of tiletamine, zolazepam and azaperone (intramuscular injection). Propofol was given in a peripheral venous catheter in an ear vein, if needed. Bolus doses of atropine and cefuroxime were administered intravenously. The animals were endotracheally intubated and mechanically ventilated (5 cm H$_2$O in positive end-expiratory pressure, minute ventilation was adjusted to normoventilation). General anaesthesia was maintained with propofol and fentanyl via continuous intravenous infusions, and additional bolus doses were given if needed. Ringer's acetate and glucose solutions were continuously administered intravenously to substitute for fluid loss. Heparin was given as an intravenous bolus dose after the surgical instrumentation. After the experiments the animals were killed in general anaesthesia with a propofol injection followed by a rapid intravenous injection of potassium chloride (40 mmol), and asystolia was confirmed.

The animals were instrumented with an arterial catheter in the right carotid artery for measurement of systemic arterial blood pressure and heart rate, and for arterial blood sampling. A sheath was placed in the right external jugular vein for introduction of a pulmonary-arterial catheter. This catheter was used for continuous measurement of pulmonary arterial blood pressure, semi-continuous cardiac output and intermittent pulmonary wedge pressure. A central venous catheter was inserted in the left external jugular vein for drug and fluid administration. All fluid and drug administrations were done by motorised syringe or drip pumps. The urinary bladder was catheterized. Respiratory gases, pressures and volumes were measured at the endotracheal tube. Respiratory and hemodynamic variables were measured by a Datex AS/3 (Helsinki, Finland) and data were collected by a computerised system (MP150/Acknowledge 3.9.1, BIOPAC systems, Goleta, CA, USA). Blood gases and methemoglobin concentration were measured by a blood gas machine (GEM 4000, Instrumental Laboratory, Lexington, Massachusetts, USA). Pulmonary and systemic vascular resistances were calculated with standard formula. After surgical instrumentation, a 1 h intervention-free period followed.

Data were presented as median and interquartile range due to non-normal distribution. The ppm dose of inhaled NO was converted to dose in nmol $kg^{-1}$ $min^{-1}$ using the ideal gas law and minute ventilation, and assuming full uptake of NO in the lung. Within drug data were analysed with Friedman's test with Wilcoxon's signed rank test for post-hoc multiple comparisons. Mann Whitney U tests were used to compare the drugs at the maximal dose and at the dose of similar NO delivery (45 nmol $kg^{-1}$ $min^{-1}$ of PDNO and 5 ppm of inhaled NO). A critical P-value of 0.05 was used and adjusted by Benjamini-Hochberg's step-up procedure in multiple comparisons.

Example 1—Preparation of 1-(nitrosooxy)-propan-2-ol, 2-(nitrosooxy)-propan-1-ol and 1,2-bis(nitrosooxy)propane with sodium nitrite 1,2-propanediol (15 mL, 205 mmol), water (100 mL), dichloromethane (200 mL) and sodium nitrite (57 g, 826 mmol) were added to a 500 mL three-necked round bottom flask. The mixture was cooled down to 0° C. with an ice bath. Concentrated sulphuric acid (30 mL, 546 mmol) and water (30 mL) were added to a dropping funnel and cooled to 5° C. in a refrigerator. The funnel was adapted to the round bottom flask and the acid added to the nitrite mixture during two hours. The mixture was stirred with a magnet for 20 minutes and then poured into a separation funnel together with more dichloromethane (100 mL) and water (100 mL). The organic phase was separated and dried with sodium sulphate, and reduced on a rotavapor to yield a mixture of 1,2-propanediol (3 wt. %), 1-(nitrosooxy)-propan-2-ol (23 wt. %) 2-(nitrosooxy)-propan-1-ol (13 wt. %) and 1,2-bis(nitrosooxy)propane (57 wt. %).

Example 2—Preparation of 1-(nitrosooxy)-propan-2-ol, 2-(nitrosooxy)-propan-1-ol and 1,2-bis(nitrosooxy)propane with sodium nitrite 1,2-propandiol (20 mL, 273.4 mmol), water (60 mL), dichloromethane (120 ml) and sodium nitrite (37.72 g, 546.7 mmol) were added to a 0.5 reactor fitted with a stirrer and flushed with nitrogen and kept during the course of the following reaction under nitrogen. The mixture was cooled down to below 5° C. by cooling the mantle to 0° C. Concentrated sulphuric acid (26.3 g, 260.1 mmol) and water were added to a dropping funnel. The funnel was attached (to the reactor and the acid was added to the nitrite mixture during 33 minutes. The mixture was stirred for 54 minutes and then poured into a flask containing an aqueous saturated sodium bicarbonate solution (100 mL). The mixture was transferred to a separation funnel and the organic phase was washed. The aqueous phase was discarded, and the organic phase was washed with additional aqueous saturated sodium bicarbonate solution (100 mL). The organic phase was dried with magnesium sulphate and then transferred to a 1 L round bottom flask together with 1,2-propandiol (120 ml, 1640 mmol). The solution was reduced on a rotavapor under reduced pressure until the dichloromethane was removed. The removal of dichloromethane was monitored by NMR. A clear solution (134 g) containing 1,2-propandiol (82.8 wt. %), 1-(nitrosooxy)-propan-2-ol (10.4 wt. %), 2-nitrosooxy)-propan-1-ol (6 wt. %) and 1,2-bis(nitrosooxy)propane (0.8 wt. %) was obtained.

$^1$H-NMR, δ ppm: 5.61 (br s 1H), 4.75-5.58 (m, 2H), 4.11 (br s, 1H), 3.90-3.87 (m, 1H), 3.83-3.69 (m, 2H), 3.60 (dd, J=3.0, 11.2 Hz, 1H), 3.38 (dd, J=7.9, 11.2 Hz, 1H), 1.47 (d, J=6.6 Hz, 3H), 1.39 (d, J=6.4 Hz, 3H), 1.26 (d, J=6.4 Hz, 3H), 1.15 (d, J=6.3 Hz, 3H), Signals for CH and $CH_2$ of the 1,2-bis(nitrosooxy)propane were below the detection limit.

Example 3—Preparation of 1-(nitrosooxy)-propan-2-ol, 2-(nitrosooxy)-propan-1-ol and 1,2-bis(nitrosooxy)propane with tert-butyl nitrite Tert-butyl nitrite (2 mL, 15.1 mmol) was added to a round bottom flask with 1,2-propanediol (11 mL, 150.3 mmol) and the obtained solution was stirred at ambient temperature. 1 mL of the reaction solution was then mixed with 7.5 mL 1,2-propanediol.

Example 4—Stability of Non-Aqueous Mixtures of 1-(nitrosooxy)-propan-2-ol, 2-(nitrosooxy)-propan-1-ol and 1,2-propanediol Three different concentrations of 1-(nitrosooxy)-propan-2-ol and 2-(nitrosooxy)-propan-1-ol in 1,2-propanediol were prepared and stored in both a refrigerator (5° C.) and freezer (−20° C.). Aliquots of each solution were taken periodically and analysed by GC to determine the concentration of 1-(nitrosooxy)-propan-2-ol and 2-(nitrosooxy)-propan-1-ol.

The results of the GC analysis are shown in the table below (column: Rxi-5Sil MS, 20 m×0.18 mm, 0.36 film thickness; carrier: He; Inlet: 250° C., split ratio 100:1; constant flow: 1.0 mL/min; oven temperature profile: 40° C. (3 min), 10° C./min, 80° C. (0 min), 30° C./min, 250° C. (3 min); FID: 300° C., $H_2$ flow 30 mL/min, air flow 400 mL/min, make-up flow ($N_2$) 25 mL/min; internal standard: 1,1,1,3,5,5,5-heptamethyl trisiloxane):

| Stability Sample | Refrigerator (5° C.) Concentration (% w/w) | | | Freezer (−20° C.) Concentration (% w/w) | | |
| --- | --- | --- | --- | --- | --- | --- |
| | 1-Nitrite | 2-Nitrite | Total | 1-Nitrite | 2-Nitrite | Total |
| Start High conc. | 3.75 | 2.94 | 6.69 | 3.75 | 2.94 | 6.69 |
| Start Medium conc. | 0.81 | 0.61 | 1.42 | 0.81 | 0.61 | 1.42 |
| Start Low conc. | 0.08 | 0.06 | 0.14 | 0.08 | 0.06 | 0.14 |
| 14 days High conc. | 3.72 | 2.91 | 6.63 | 3.76 | 2.89 | 6.65 |
| 10 days Medium conc. | 0.86 | 0.67 | 1.53 | 0.81 | 0.63 | 1.44 |
| 10 days Low conc. | 0.08 | 0.06 | 0.14 | 0.08 | 0.06 | 0.14 |
| 28 days High conc. | 3.67 | 2.90 | 6.57 | 3.72 | 2.93 | 6.65 |
| 27 days Medium conc. | 0.81 | 0.63 | 1.44 | 0.74 | 0.57 | 1.31 |
| 27 days Low conc. | 0.09 | 0.07 | 0.16 | 0.07 | 0.06 | 0.13 |

-continued

|  | Refrigerator (5° C.) Concentration (% w/w) | | | Freezer (−20° C.) Concentration (% w/w) | | |
| --- | --- | --- | --- | --- | --- | --- |
| Stability Sample | 1-Nitrite | 2-Nitrite | Total | 1-Nitrite | 2-Nitrite | Total |
| 56 days High conc. | 3.47 | 2.69 | 6.16 | 3.55 | 2.74 | 6.29 |
| 64 days Medium conc. | 0.73 | 0.57 | 1.30 | 0.74 | 0.58 | 1.32 |
| 64 days Low conc. | 0.07 | 0.06 | 0.13 | 0.07 | 0.06 | 0.13 |
| 84 days High conc. | 3.33 | 2.59 | 5.92 | 3.50 | 2.71 | 6.21 |
| 84 days Medium conc. | 0.77 | 0.60 | 1.37 | 0.78 | 0.62 | 1.40 |
| 84 days Low conc. | 0.07 | 0.06 | 0.13 | 0.08 | 0.06 | 0.14 |

Note:
no build-up of pressure was observed for any of the samples.

Example 5—Stability of Aqueous Buffered Solutions of 1-(nitrosooxy)-propan-2-ol and 2-(nitrosooxy)-propan-1-ol (PDNO), and 1,2-propanediol (PD)

100 µl of the stability sample was added to a GC vial. 400 µl of a solution PD/Buffer (1:9) and 400 µl $CH_3CN$ were added. Then 500 µl $CH_2Cl_2$ was added and the mixture extracted by gentle shaking for 1 min. 500 µl of the organic phase (lower phase) was transferred to another GC vial and 50 µl IS added. The extract was analysed by GC/FID according to the conditions above.

Calibration curves for 1-nitrite and 2-nitrite, respectively, were constructed. The peak area ratio (Nitrite/IS) vs. amount of nitrite was plotted. Stock solutions of PDNO/PD at high concentration were used for preparing the standards. Concentrations of nitrites in % w/w were calculated.

The results obtained are shown in the table below and in FIG. 1.

| Change in concentration PDNO/Buffer or Saline (1:9) | | | | |
| --- | --- | --- | --- | --- |
| | % of the original concentration, i.e. 0.02% w/w | | | |
| Sample | 5% $NaHCO_3$ (pH 8)* | 0.154M Carbonate (pH 9.2)* | 0.154M Phosphate (pH 8.0)* | Saline |
| 0 min | 100.0 | 100.0 | 100.0 | 45.3 |
| 15 min | 91.1 | 95.8 | 97.4 | 43.0 |
| 30 min | 85.1 | 92.5 | 93.1 | 42.9 |
| 45 min | 75.7 | 85.5 | 86.4 | 40.9 |
| 60 min | 72.5 | 79.6 | 84.1 | 38.8 |

*Based on known values.

Example 6—In Vivo Studies

After collecting baseline data, stable pulmonary hypertension was induced by continuous intravenous infusion of the thromboxane A2-mimetic 9,11-dideoxy-9α,11α-methanoepoxy $PGF_{2\alpha}$ (U46619, Cayman Chemical, Michigan, USA; supplied in methyl acetate and diluted in NaCl 0.9% to a final concentration of 30 µg ml$^{-1}$; 60-150 ng kg$^{-1}$ min$^{-1}$ to a target mean pulmonary arterial pressure of 35-45 mmHg). Thereafter either a continuous intravenous infusion of PDNO in increasing doses (15, 30, 45 and 60 nmol kg$^{-1}$ min$^{-1}$) into a carrier flow of a solution of sodium bicarbonate (50 mg ml$^{-1}$; pH approximately 8; Fresenius Kabi, Uppsala, Sweden; infusion rate 10 times of the PDNO infusion rate) or inhalation of NO (5, 10, 20 and 40 ppm; delivered into the inspiratory limb of a Servo 300 ventilator with a inhaled NO dosing unit [Siemens-Elema, Stockholm, Sweden] from a tank of 1000 ppm in nitrogen) in non-randomised cross-over design with a wash-out period of 30 min between the drugs. Correct dosage of inhaled NO was checked with a NO analyser. Each dose was administered for 5-10 min. Hemodynamic and respiratory data were extracted, and arterial blood was sampled, at the last minute of each dose.

Figure 2:
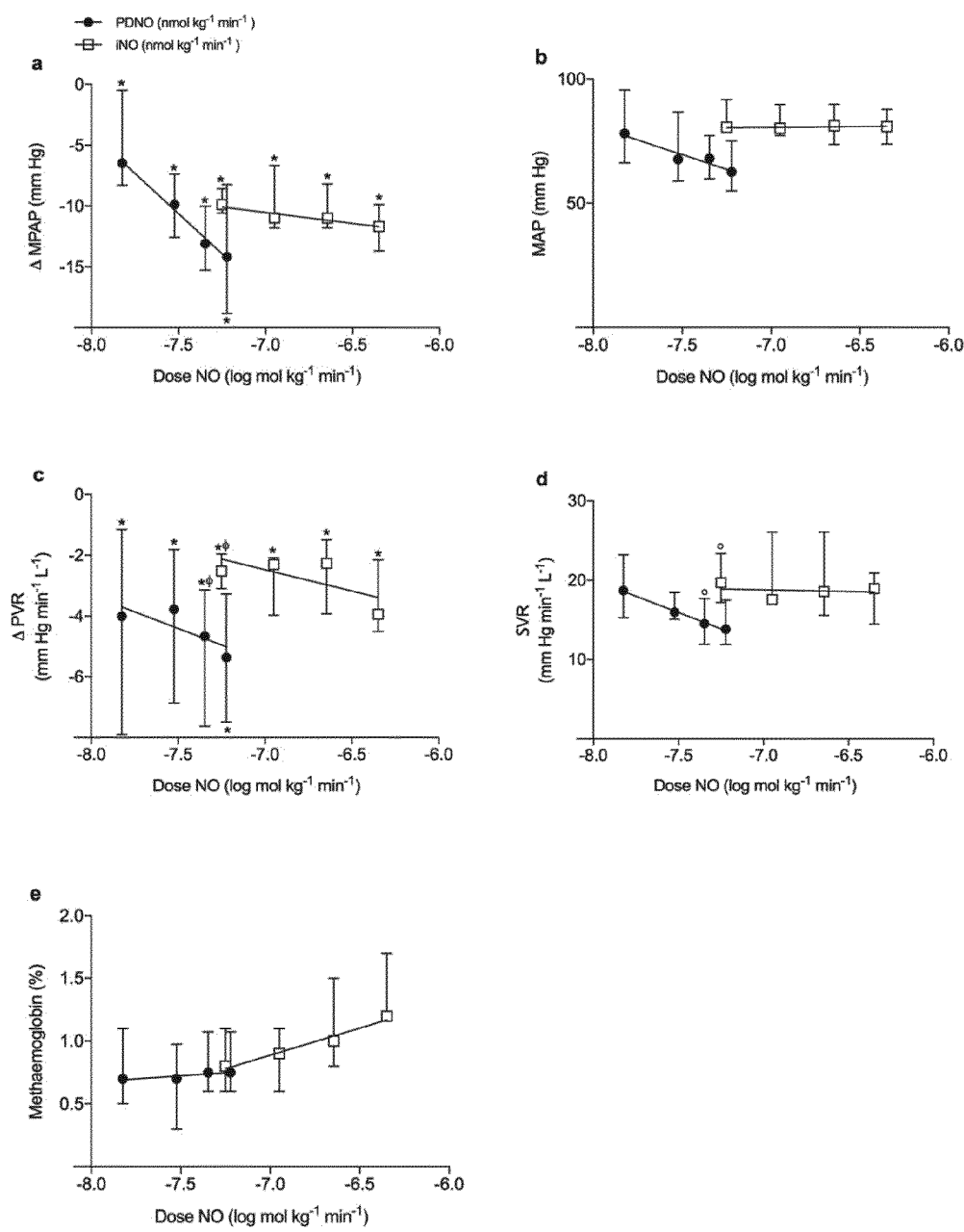
FIG. 2: Shows the results of an in vivo study comparing the effects of compositions of the invention in treatment when compared to inhaled nitric oxide as described in Example 6 herein. Change in mean pulmonary arterial pressure (MPAP, panel a) and pulmonary vascular resistance (PVR, panel c), and mean arterial pressure (MAP, panel b), systemic vascular resistance (SVR, panel d) and methemoglobin concentration in anesthetised and mechanically ventilated pigs subjected to either intravenous infusion of PDNO (15, 30, 45 and 60 nmol kg$^{-1}$ min$^{-1}$ into a carrier flow of sodium bicarbonate [50 mg ml$^{-1}$; at an infusion rate of 10 times the PDNO infusion rate]; n=6) or inhalation of NO (5, 10, 20 and 40 ppm; n=7) during intravenous infusion of the pulmonary vasoconstrictor U46619 (60-150 ng kg$^{-1}$ min$^{-1}$). The dose of inhaled NO was converted to nmol kg$^{-1}$ min$^{-1}$. The x-axis is in the logarithmic scale. Data are presented as median and interquartile range. * indicates a statistically significant effect of the indicated dose from only U46619 in each drug. 019 indicates a statistical difference between PDNO at 45 nmol kg$^{-1}$ min and inhaled NO at 5 ppm, i.e. a comparable amount of NO delivery.

Intravenous infusion of U46619 induced stable pulmonary hypertension with mean pulmonary arterial pressure of 43 (37-48) mmHg and 43 (41-46) mmHg, and pulmonary vascular resistance of 8.3 (6.7-11.7) mmHg min l$^{-1}$ and 9.8 (7.7-12.5) mmHg min l$^{-1}$, before NO inhalation and PDNO infusion, respectively. Both inhaled NO and intravenously infused PDNO significantly reduced pulmonary arterial pressure and vascular resistance, but PDNO decreased mean pulmonary arterial pressure more efficiently (steeper slope) than inhaled NO, and PDNO decreased pulmonary vascular resistance significantly more compared to inhaled NO at a comparable dosage (as shown in FIG. 2). No drug significantly affected mean arterial pressure and systemic vascular resistance, but the systemic vascular resistance was slightly lower in the PDNO group compared to the inhaled NO group at a comparable dose (FIG. 2). Both drugs significantly decreased the pulmonary-to-systemic vascular resistances ratio, and at the highest doses this ratio was slightly lower in the inhaled NO group compared to the PDNO group (data not shown). Cardiac output was slightly decreased by U46619, but no drug significantly changed cardiac output (data not shown). No drug significantly affected the methemoglobin concentration, but there was a tendency for an increase in the inhaled NO group and it seemed that the methemoglobin concentration was associated to the dose of delivered NO (FIG. 2). The arterial partial pressure of oxygen was slightly decreased by U46619, and both drugs increased this variable towards normal (data not shown).

Example 7—Solvent Free Preparation of 1-(nitrosooxy)-propan-2-ol, 2-(nitrosooxy)-propan-1-ol, and 1,2-bis(nitrosooxy)propane with sodium nitrite Water (30 mL) and sodium nitrite (19.01 g, 272.8 mmol) were added to a 100 mL three-necked round bottom flask, flushed with nitrogen and cooled down to 1° C. on a water bath cooled with an external cooler. 1,2-Propanediol (10 mL, 136.7 mmol) was added. Concentrated sulphuric acid (7 mL, 127.4 mmol) and water (20 mL) were pre-cooled to room temperature and added dropwise during one hour via a dropping funnel. During the addition, the water layer formed a thick slurry and a green second layer was formed. Before completion of acid addition (5 mL remaining) the flask was removed from the cooling bath and the green layer was decanted into a separation funnel and washed with 2× saturated aqueous $NaHCO_3$ solution. The green layer faded to yellow and after separation was dried over $Na_2SO_4$ and filtered through a syringe filter (Acrodisc® 13 mm, 0.45 µM SUPOR®) to yield 1.1 g mixture of approximately 0.25/0.1/1 of 1-(nitrosooxy)-propan-2-ol/2-(nitrosooxy)-propan-1-ol/1,2-bis(nitrosooxy)propane. No starting-material 1,2-propanediol could be detected within the limits of NMR sensitivity.

¹H-NMR, δ ppm: 5.81-5.76 (m, br, 1.0H), 5.63 (br, 0.1H), 4.93 (br, 2.08H), 4.73-4.65 (br, m, 0.47H), 4.14 (br, 0.19H), 3.84-3.77 (br, m, 0.22H), 1.49-1.48 (br, m, 3.21H), 1.43 (br, 0.51H), 1.28 (br, 0.72H).

Example 8—Preparation of (2S)-1-(nitrosooxy)-propan-2-ol, (2S)-2-(nitrosooxy)-propan-1-ol and (2S)-1,2-bis(nitrosooxy)propane (S)-1,2-propanediol (5 mL, 66.97 mmol), water (15 mL), dichloromethane (30 mL) and sodium nitrite (9.34 g, 134 mmol) were added to a 100 mL three-necked round bottom flask, flushed with nitrogen and cooled down to 1° C. on a water bath cooled with an external cooler. Concentrated sulphuric acid (3.5 mL, 63.69 mmol) and water (10 mL) were pre-cooled to room temperature and added dropwise via a syringe-pump during 1 h. After addition the mixture was stirred for additional 60 minutes. After separation of the two layers, the DCM layer was diluted with additional DCM (15 mL) and washed with sat. aq. NaHCO₃ (15 mL), followed by brine (15 mL), then dried over Na₂SO₄, filtered over a sintered glass filter and reduced in vacuo. The residue was taken up again in 30 mL DCM, washed with 1.4% w/w aq. bicarbonate solution, then dried over Na₂SO₄, filtered over a sintered glass filter and reduced in vacuo to yield 1 g of product mixture. The mixture of consisted of (2S)-1,2-propanediol (3%), (2S)-1-(nitrosooxy)-propan-2-ol (23%), (2S)-2-(nitrosooxy)-propan-1-ol (14%) and (2S)-1,2-bis(nitrosooxy)propane (60%) based on NMR.

¹H-NMR, δ ppm: 5.83-5.74 (m, 1.0H), 5.66-5.57 (br, 0.22H), 4.99-4.85 (br, 1.98H), 4.76-4.59 (br, 0.77H), 4.17-4.07 (br, 0.38H), 3.86-3.73 (br, 0.40H), 1.8-1.6 (br, 0.97H), 1.48 (d, J=6.7 Hz, 3.12H), 1.40 (d, J=6.6 Hz, 0.63H), 1.28 (d, J=6.5 Hz, 1.15H).

Example 9—Preparation of (2R)-1-(nitrosooxy)-propan-2-ol, (2R)-2-(nitrosooxy)-propan-1-ol and (2R)-1,2-bis(nitrosooxy)propane (R)-1,2-propanediol (5 mL, 66.97 mmol), water (15 mL), dichloromethane (30 mL) and sodium nitrite (9.34 g, 134 mmol) were added to a 100 mL three-necked round bottom flask, flushed with nitrogen and cooled down to 1° C. on a water bath cooled with an external cooler. Concentrated sulphuric acid (3.5 mL, 63.69 mmol) and water (10 mL) were pre-cooled to room temperature and added dropwise via a syringe-pump during 1 h. After addition the mixture was stirred for additional 55 minutes. After separation of the two layers, the DCM layer was diluted with additional DCM (10 mL) and washed with saturated aqueous NaHCO₃ (20 mL), then dried over Na₂SO₄, filtered over a sintered glass filter and reduced in vacuo. The mixture of consisted of (2R)-1,2-propanediol (17%), (2R)-1-(nitrosooxy)-propan-2-ol (16%), (2R)-2-(nitrosooxy)-propan-1-ol (7%) and (2R)-1,2-bis(nitrosooxy)propane (59%) based on NMR.

¹H-NMR, δ ppm: 5.83-5.74 (m, 1.0H), 5.66-5.57 (br, 0.12H), 4.99-4.85 (br, 2.10H), 4.76-4.59 (br, 0.53H), 4.17-4.07 (br, 0.24H), 3.86-3.73 (br, 0.28H), 2.4-2.1 (br, 0.38H), 1.48 (d, J=6.8 Hz, 3.20H), 1.40 (br, 0.56H), 1.28 (br(d), 0.88H).

Example 10—Preparation of 1-(nitrosooxy)propan-3-ol and 1,3-bis(nitrosooxy)propane 1,3-propanediol (2.5 g, 32.86 mmol), water (7 mL), dichloromethane (15 mL) and sodium nitrite (4.53 g, 65.7 mmol) were added to a 100 mL round bottom flask, flushed with nitrogen and cooled down to 0° C. for 15 min on a water bath cooled with an external cooler. Concentrated sulphuric acid (1.7 mL, 31.2 mmol) and water (5 mL) were pre-cooled to room temperature and added dropwise for 5 minutes. After addition the mixture was stirred for additional 60 minutes at 0° C. The two layers was then separated, and the organic phase was diluted with additional DCM (10 mL), washed with saturated aqueous NaHCO₃ (2×25 mL), dried over MgSO₄, filtered over a sintered glass filter. Finally, 1,3-propanediol (16.4 g 216 mmol) was added to the organic phase followed by removal of DCM in vacuo. Based on NMR the mixture (18.1 g) contained 1,3-propandiol (86.9 wt. %), 1-(nitrosooxy)-propan-3-ol (11.8 wt. %), and 1,3-bis(nitrosooxy)propane (1.3 wt. %).

1H-NMR, δ 4.76-4.88 (m, 2H), 3.83 (t, J=5.7 Hz, 2H), 3.73 (t, J=6.1 Hz, 2H), 2.79 (s, 1H), 2.18 (quintet, J=6.3 Hz, 2H), 1.99 (quintet, J=6.2 Hz, 2H), 1.80 (quintet, J=5.7 Hz, 2H).

Example 11—Scaled Up Process for the Preparation of 1-(nitrosooxy)-propan-2-ol, 2-(nitrosooxy)-propan-1-ol and 1,2-bis(nitrosooxy)propane with sodium nitrite 11.1 Chemicals Used Starting materials were purchased from the list of suppliers in the table below. Unless otherwise noted the chemicals were used as received without further purification.

| List of used chemicals and solvents Chemical/Solvent | Grade | Supplier |
|---|---|---|
| 1,2-Propanediol | EMPROVE ® ESSENTIAL Ph. Eur. or BP or USP, ≥99% | Merck |
| Sodium nitrite | Conforms to current ACS, USP or Ph. Eur., ≥97% | VWR, Acros |
| Sulfuric acid | ≥95.0, Conforms to current ACS, USP or Ph. Eur. | VWR, Acros |
| TBME | Conforms to current ACS, USP or Ph. Eur., ≥99% | VWR, Acros |
| Sodium bicarbonate | Conforms to current ACS, USP or Ph. Eur. | VWR, Acros |
| Magnesium sulfate | USP, dried | VWR, Acros |
| Arqon | 4.8 or higher | Linde AG, Westfalen AG |

11.2 General Procedure for the Synthesis of PDNO Using DCM as Solvent (Origin Process)

A round bottom flask was equipped with a stirrer and dropping funnel. Water (3.0 veq.) was added and sodium nitrite (2.0 equiv.) was charged to the flask. The solution was cooled (0° C.) and PD (1.0 equiv.) and DCM (6 rel. vol.) were also added. During further cooling, a sulfuric acid solution (1.0 eq. H₂SO₄, 2.0 rel. vol. water) was prepared. The sulfuric acid solution was further added dropwise to the reaction mixture while keeping the reaction mixture between 0° C. and 5° C. After complete addition of the acid, the solution was further stirred for 1 h to complete reaction.

Then, the reaction was quenched with saturated NaHCO₃ solution (6.0 rel. vol.). The phases were separated, and the organic layer was further washed with NaHCO₃ solution (6.0 rel. vol.). The organic phase was dried over MgSO₄, filtered, diluted with PD, and concentrated under reduced pressure using a rotary evaporator (water bath temperature 40° C.).

The product was obtained as a slightly yellowish liquid.

11.3 General Synthesis of PDNO Using TBME as Solvent

A round bottom flask was equipped with stirrer and dropping funnel. Argon was flushed through for several minutes. A diluted sulfuric acid solution (1.0 eq. $H_2SO_4$, 2.0 rel. vol. water) was prepared in advanced and precooled (−30° C.). Water was added to the flask (3.0 rel. vol.). Sodium nitrite (2.0 equiv.) was added into the water. TBME (7.5 rel. vol.) was added. Propanediol (1.0 equiv.) was added and the reaction mixture was cooled (−20° C.) flushing constantly with argon. The reaction mixture was stirred well while adding dropwise the precooled sulfuric acid. The reaction temperature was monitored during the entire addition of the acid. After addition, the reaction mixture was further stirred (30-60 min) at cold temperature (−20° C.). Afterwards, the reaction mixture was allowed to warm up (−5° C.). The reaction was stopped by quenching with saturated $NaHCO_3$ solution (6.0 rel. vol.). The phases were separated. The organic layer was further washed with saturated $NaHCO_3$ solution until a pH value of 7-8 was obtained. The organic phase was then dried over $MgSO_4$. The crude PDNO solution was diluted with PD (3 rel. vol.) and further concentrated under reduced pressure at ambient temperature (25° C.).

The crude PDNO solution was further purified using a vertical tube evaporation apparatus.

PDNO was obtained as a slightly yellowish liquid.

11.4 Detailed Synthesis of PDNO Using TBME as Solvent

The process was designed to produce approx. 7.5 L of 7% PDNO solution with one synthesis (one "run"). The synthesis was performed several times, to give the desired batch size. GC analysis was used each single run for purity determination. The runs which are within the specifications for the organic related compounds can be blended together to yield one batch. The entire crude PDNO batch was then purified. After purification, the strong PDNO solution was then further diluted with PD to yield the desired concentration (usually 7% PDNO solution).

A suitable double wall reactor (60 L) was equipped with specific "cup-stirrer", dropping funnel and attachment for argon. The reactor was flushed for 5 min to 10 min with a constant argon stream. Water (3.0 L) was added to the reactor. Sodium nitrite (2.0 equiv., 1886 g) was added through the reactor. The reaction was further stirred until all of the salt was dissolved. 1,2-propanediol (1.0 equiv., 1040 g, 1 L) was added, followed by tert-butylmethyl ether (7.5 rel. vol., 7.5 L). The reaction mixture was then cooled by continuous stirring and argon flow at an inner reaction temperature of −20° C. Meanwhile sulfuric acid (1.0 equiv., 1340 g, 728 mL) was diluted with water (2.0 L) and cooled at −30° C. After reaching an inner reaction temperature of −20° C., the diluted acid was added dropwise to the reaction mixture while vigorous stirring.

The stirring speed was varied during the addition of the acid. Starting with approx. 350 rpm to a slower stirring speed by the end of the reaction (approx. 180 rpm). This variation of the stirring speed is due the two-phase reaction system and the slowly precipitation of sodium sulfate by further progress of the reaction (due to the addition of more and more sulfuric acid).

During the entire addition of the sulfuric acid, the reaction temperature was monitored. The temperature should ideally be in range of (−20±3) ° C. In addition, the reaction was stirred for 30-60 min at (−20±3) ° C.

The reaction was allowed to warm up to −5° C. to 0° C. The reaction was stopped by the addition of saturated $NaHCO_3$ solution (6.0 rel. vol 6.0 L) followed by the addition of water (10 L). The phases were separated and the organic layer was transferred into a separate double wall reactor and chilled at 0° C. to −5° C. The organic layer was washed several times (approx. 2-3 times) with saturated $NaHCO_3$ solution (4.0 rel. vol., 4.0 L). The pH value of the water phase was monitored after each washing step. The pH value was about 7-8. The water phases were discarded. The organic layer was dried over $MgSO_4$ and filtered over a Whatman filter paper.

The crude PDNO (solution in TBME) was diluted by the addition of further PD (3.0 rel. vol., 3.0 L). This crude PDNO was transferred to a rotary evaporator and concentrated under reduced pressure. The water bath temperature during the evaporation was maintained at a maximum temperature of 25° C. The evaporation of the main amount of TBME was removed in a time range between 1.5 h and 2.0 h.

The evaporation of the organic solvents could then be continued at a water bath temperature at (0±2) ° C. for several hours using a high vacuum pump (during the development the PDNO purity was monitored at these conditions, and over a period of 6 h the product purity was not affected).

11.5 Further Purification of the Crude PDNO Solution

The final purification of the PDNO solution was done by vertical tube evaporation. The PDNO solution was distilled under high vacuum with a continuous thin steam of PDNO at 0° C. The storing tank for the "crude" PDNO solution was chilled at 0° C. The entire distillation was performed at 0° C. The storage tank for the "purified" PDNO was also chilled at −10° C. to 0° C. After each run of the evaporation of the entire batch PDNO, the residual organic solvent (TBME) can be checked via GC. This evaporation was continued until the desired limit for the residual solvents was achieved. In the case of PDNO the limit for the residual solvent is 1000 ppm.

11.6 Preparation of the Final Dilution

After purification, PDNO was further diluted to reach the favoured concentration. The first step was to filter the PDNO solution into a clean glass bottle via Whatman filter. In addition, the assay of the PDNO solution was determined via q-NMR. The amount of PD for dilution can be calculated. The PD was filtered first over a Whatman filter. The final dilution can be done at ambient temperatures. The calculated amount of PD was added to the PDNO solution (or the other way around). The resulting mixture was shaken for several minutes to obtain a homogeneous solution. The final PDNO solution was filled into the product bottles.

PDNO (7.5 kg; 7% solution) was yielded as a slightly yellowish liquid.

Example 12—Hemodynamic Effects of Intravenous PDNO: Influence of Various Carrier Solutions in Anesthetized Pigs The influence of various carrier solutions on the hemodynamic effects of the organic mononitrites of 1,2-propanediol (PDNO), administered intravenously in anesthetized pigs, was studied.

Prior to experimentation, ethical approval was received from Linköping's regional animal ethics committee (Linköping, Sweden; approval number 953). The study was conducted in accordance with the Directive 2010/63/EU on the protection of animals used for scientific purposes. Two healthy domestic 3-month-old pigs (a crossbreed between Swedish country breed, Hampshire and Yorkshire; a body weight of 26 and 27 kg) were included in the study.

The animals were premedicated with azaperone at the farm and transported to the laboratory. At the laboratory, anesthesia was induced with a mixture of tiletamine, zolazepam and azaperone (intramuscular injection). Propofol was given in a peripheral venous catheter in an ear vein, if needed. Bolus doses of atropine and cefuroxime were administered intravenously. The animals were endotracheally intubated and mechanically ventilated (5 cm $H_2O$ in positive end-expiratory pressure, minute ventilation was adjusted to normoventilation). General anesthesia was maintained with propofol and fentanyl via continuous intravenous infusions, and additional bolus doses were given if needed. Ringer's acetate and glucose solutions were continuously administered intravenously to substitute for fluid loss. Heparin was given as an intravenous bolus dose after the surgical instrumentation. After the experiments the animals were killed in general anesthesia with a propofol injection followed by a rapid intravenous injection of potassium chloride (40 mmol), and asystole was confirmed.

The animals were instrumented with an arterial catheter in the right carotid artery for measurement of systemic arterial blood pressure and heart rate. A sheath was placed in the right external jugular vein for introduction of a pulmonary-arterial catheter. This catheter was used for continuous measurement of pulmonary arterial blood pressure and semi-continuous cardiac output. A central venous catheter was inserted in the left external jugular vein for drug and fluid administration. All fluid and drug administrations were done by motorized syringe or drip pumps. The urinary bladder was catheterized. Hemodynamic variables were measured by a Datex AS/3 (Helsinki, Finland) and data were collected by a computerized system (MP150/Acknowledge 3.9.1, BIOPAC systems, Goleta, CA, USA). After surgical instrumentation, at least an 1 h intervention-free period followed.

Intravenous infusions of PDNO were administered (Research Institutes of Sweden, Södertälje, Sweden) at 30 nmol $kg^{-1}$ $min^{-1}$ for 15 min into a carrier flow, at an infusion rate 9 times of the PDNO infusion rate, of sodium bicarbonate (14 mg $mL^{-1}$; pH 7.4 or 8.0), physiological phosphate buffer at pH 8 or physiological saline. Standard chemicals were used to produce the carrier solutions. The hemodynamic effect was measured at the end of each infusion.

The results are shown in the table below. Baseline values before each intravenous combination of PDNO and carrier solution were normal for healthy, anesthetized pigs. Intravenous PDNO in a carrier solution of bicarbonate buffer at pH 8 decreased mean systemic arterial pressure (MAP) and mean pulmonary arterial pressure (MPAP) by −11±1.2 mmHg and −2.4±0.8 mmHg, respectively, whereas intravenous PDNO in a carrier solution of physiological saline decreased MAP and MPAP by −6.9±2.5 mmHg and −2.4±0.1 mmHg. Intravenous PDNO in combination with bicarbonate buffer at pH 7.4 and physiological phosphate buffer at pH 8 had similar effects on MAP and MPAP as physiological saline. Heart rate and semi-continuous cardiac output were only slightly affected by the infusions.

Hemodynamic variables in anesthetized and mechanically ventilated pigs subjected to repeated intravenous infusions PDNO at 30 nmol $kg^{-1}min^{-1}$ in combination with various carrier solutions (n=2 per carrier solution).

| PDNO at 30 nmol $kg^{-1}$ $min^{-1}$ in carrier solutions | MAP (mmHg) | MPAP (mmHg) | HR (beats $min^{-1}$) | CCO (L $min^{-1}$) |
|---|---|---|---|---|
| Baseline | 66.5 ± 1.0 | 18.9 ± 2.8 | 86 ± 1 | 4.5 ± 0.6 |
| Bicarbonate buffer at pH 8.0 | 55.5 ± 2.2 | 16.5 ± 1.9 | 93 ± 11 | 4.4 ± 0.1 |
| Baseline | 67.5 ± 2.8 | 20.7 ± 1.7 | 81 ± 6 | 3.8 ± 0.5 |
| Physiological saline | 60.6 ± 0.3 | 18.3 ± 1.8 | 83 ± 8 | 3.9 ± 0.4 |
| Baseline | 65.6 ± 1.1 | 20.6 ± 2.0 | 76 ± 1 | 3.6 ± 0.1 |
| Phosphate buffer at pH 8 | 59.0 ± 0.7 | 18.0 ± 1.6 | 82 ± 7 | 3.8 ± 0.2 |
| Baseline | 68.3 ± 4.0 | 20.8 ± 1.8 | 77 ± 1 | 3.4 ± 0.1 |
| Bicarbonate buffer at pH 7.4 | 61.0 ± 5.9 | 17.2 ± 1.6 | 81 ± 5 | 3.6 ± 0.1 |

Data are presented as means and standard deviations.

Mean systemic arterial pressure (MAP), mean pulmonary arterial pressure (MPAP), heart rate (HR), semi-continuous cardiac output (CCO).

Intravenous PDNO in combination with a carrier solution of bicarbonate buffer at pH 8 produced larger hemodynamic effects compared to carrier solutions of physiological saline, physiological phosphate buffer and bicarbonate buffer at pH 7.4.

Example 13—Pharmacological Investigation of 1,2-PDNO—R, 1,2-PDNO—S and 1,3-PDNO in Anesthetised Pigs Prior to experimentation, ethical approval was received from Linköping's regional animal ethics committee (Linköping, Sweden; approval number 953). In brief, 2 male and female pigs (a crossbreed between Swedish country breed, Hampshire and Yorkshire; 3-4 months old; 24-26 kg) were premedicated with azaperone at the farm and transported to the laboratory. At the laboratory, anaesthesia was induced with a mixture of tiletamine, zolazepam and azaperone (intramuscular injection). Propofol was given in a peripheral venous catheter in an ear vein, if needed. Bolus doses of atropine and cefuroxime were administered intravenously. The animals were endotracheally intubated and mechanically ventilated (5 cm $H_2O$ in positive end-expiratory pressure, minute ventilation was adjusted to normoventilation). General anaesthesia was maintained with propofol and fentanyl via continuous intravenous infusions, and additional bolus doses were given if needed. Ringer's acetate and glucose solutions were continuously administered intravenously to substitute for fluid loss. Heparin was given as an intravenous bolus dose after the surgical instrumentation. After the experiments the animals were killed in general anaesthesia with a propofol injection followed by a rapid intravenous injection of potassium chloride (40 mmol), and asystolia was confirmed.

The animals were instrumented with an arterial catheter in the right carotid artery for measurement of systemic arterial blood pressure and heart rate. A sheath was placed in the right external jugular vein for introduction of a pulmonary-arterial catheter. This catheter was used for continuous measurement of pulmonary arterial blood pressure, semi-continuous cardiac output and intermittent pulmonary wedge pressure. A central venous catheter was inserted in the left external jugular vein for drug and fluid administration. All fluid and drug administrations were done by motorised syringe or drip pumps. The urinary bladder was catheterized. Respiratory gases, pressures and volumes were measured at the endotracheal tube. Respiratory and hemodynamic variables were measured by a Datex AS/3 (Helsinki, Finland) and data were collected by a computerised system (MP100 or MP150/Acknowledge 3.9.1, BIOPAC systems, Goleta, CA, USA). After surgical instrumentation, a 1 h intervention-free period followed.

After collecting baseline data, a 10-15 min intravenous infusion of 1,2-PDNO—R (43 nmol $kg^{-1}$ $min^{-1}$), 1,2-PDNO—S (43 nmol $kg^{-1}$ min) and 1,3-PDNO (30 nmol $kg^{-1}$ $min^{-1}$) was administered into a carrier flow of a solution of sodium bicarbonate (14 mg $mL^{-1}$; pH approximately 8; infusion rate 9 times of the PDNO infusion rate). Hemodynamic and respiratory data were extracted at the end of each dose.

Figure 3:
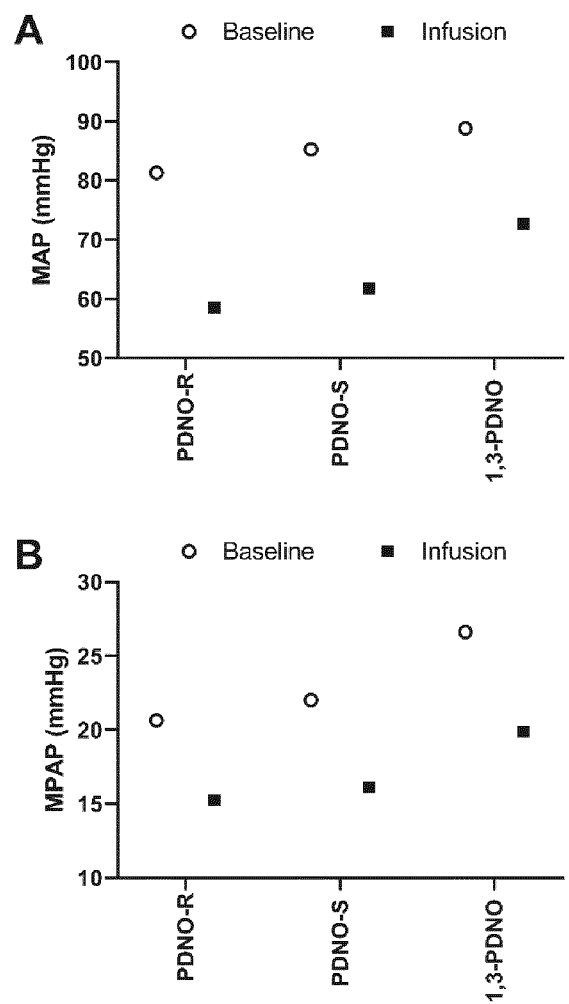
FIG. 3 shows the results of using 1,2-PDNO—R, 1,2-PDNO—S and 1,3-PDNO to decrease mean systemic and pulmonary arterial pressure, with the experimental procedure outlined in Example 13.

1,2-PDNO—R, 1,2-PDNO—S and 1,3-PDNO decreased mean systemic and pulmonary arterial pressure, which are shown in FIG. 3. The conclusion is that 1,2-PDNO—R, 1,2-PDNO—S and 1,3-PDNO caused systemic and pulmonary vasodilation, thus they exhibit vasodilating capacity.

The invention claimed is:

1. A substantially non-aqueous composition comprising:
(a) one or more compounds of formula I

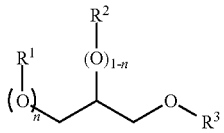

wherein $R^1$, $R^2$ and $R^3$ each independently represent H or —NO,
wherein n is 0 or 1; and
wherein when n is 0, $R^1$ is H; and
wherein when n is 1, $R^2$ is H provided that at least one of $R^1$ $R^2$ and $R^3$ represents —NO; and
(b) a compound of formula I wherein $R^1$, $R^2$ and $R^3$ represent H.

2. A composition as claimed in claim 1, wherein the composition comprises from about 0.01% to about 9% by weight of the one or more compounds of formula I.

3. A composition as claimed in claim 1, wherein the composition is substantially free of dissolved nitric oxide.

4. A composition as claimed in claim 1, wherein the composition consists essentially of the one or more compounds of formula I and a compound of formula I but wherein $R^1$, $R^2$ and $R^3$ represent H.

5. A composition comprising:
(a) one or more compounds of formula I

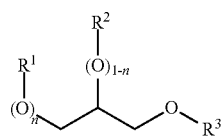

wherein $R^1$, $R^2$ and $R^3$ each independently represent H or —NO,
wherein n is 0 or 1; and
wherein when n is 0, $R^1$ is H and
wherein when n is 1, $R^2$ is H,
provided that at least one of $R^1$ $R^2$ and $R^3$ represents —NO and
(b) a compound of formula I wherein $R^1$, $R^2$ and $R^3$ represent H, wherein components (a) and (b) of the composition are present in a combined amount of at least 80% by weight of the composition and wherein the composition comprises less than 1% by weight of water.

6. The composition as claimed in claim 5, wherein components (a) and (b) of the composition are present in a combined amount of at least 85% by weight of the composition.

7. The composition as claimed in claim 5, wherein components (a) and (b) of the composition are present in a combined amount of at least 90% by weight of the composition.

8. The composition as claimed in claim 5, wherein components (a) and (b) of the composition are present in a combined amount of at least 95% by weight of the composition.

9. The composition as claimed in claim 5, wherein the composition comprises from 0.01% to 9% by weight of the one or more compounds of formula I.

10. The composition as claimed in claim 5, wherein the composition is free of dissolved nitric oxide.

11. The composition as claimed in claim 5, wherein the composition consists essentially of the one or more compounds of formula I and the compound of formula I wherein $R^1$, $R^2$ and $R^3$ represent H.

* * * * *